US011172553B2

(12) United States Patent
Baer et al.

(10) Patent No.: US 11,172,553 B2
(45) Date of Patent: Nov. 9, 2021

(54) ACCESSORY STROBE INTERFACE

(71) Applicant: Apple Inc., Cupertino, CA (US)

(72) Inventors: Richard L. Baer, Los Altos, CA (US); Edwin W. Foo, Sunnyvale, CA (US); Michael F. Jean, San Francisco, CA (US); Mohamad H. Suleiman, San Jose, CA (US); Parin Patel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/005,214

(22) Filed: Aug. 27, 2020

(65) Prior Publication Data

US 2021/0068217 A1    Mar. 4, 2021

Related U.S. Application Data

(60) Provisional application No. 62/893,356, filed on Aug. 29, 2019.

(51) Int. Cl.
| | |
|---|---|
| *H05B 45/10* | (2020.01) |
| *H05B 47/19* | (2020.01) |
| *G03B 15/05* | (2021.01) |
| *H04M 1/21* | (2006.01) |

(52) U.S. Cl.
CPC ............. *H05B 45/10* (2020.01); *G03B 15/05* (2013.01); *H04M 1/21* (2013.01); *H05B 47/19* (2020.01); *G03B 2215/056* (2013.01); *G03B 2215/0567* (2013.01)

(58) Field of Classification Search
None
See application file for complete search history.

(56) References Cited

U.S. PATENT DOCUMENTS

| 9,674,416 | B2 | 6/2017 | Chen et al. | |
|---|---|---|---|---|
| 2002/0064384 | A1* | 5/2002 | Kawasaki | G03B 15/05 396/157 |
| 2005/0243198 | A1* | 11/2005 | Pardikes | H04N 5/2256 348/370 |
| 2011/0135293 | A1* | 6/2011 | Shitomi | H04N 5/2354 396/157 |
| 2015/0195445 | A1* | 7/2015 | Watanabe | G03B 15/05 348/211.2 |
| 2015/0334258 | A1 | 11/2015 | O'Neill | |

(Continued)

*Primary Examiner* — Anh Q Tran
(74) *Attorney, Agent, or Firm* — Kowert, Hood, Munyon, Rankin & Goetzel, P.C.; Gareth M. Sampson

(57) ABSTRACT

An accessory strobe device for a mobile device may operate to provide illumination at the same time as an internal built-in strobe (flash) of the mobile device. The accessory strobe device may receive a single, unidirectional signal from the mobile device that provides signals related to the timing of the internal strobe. The accessory strobe device may process the received signal to control its illumination using the timing and relative intensity levels of the internal strobe during metering and main (normal) flash operations associated with a camera on the mobile device. With the accessory strobe device operating using timing and relative intensity levels in a predetermined relationship with the timing and relative intensity levels of the internal strobe, the accessory strobe device may be used to complement the internal strobe during the metering and main (normal) flash operations for the camera.

20 Claims, 11 Drawing Sheets

(56) References Cited

U.S. PATENT DOCUMENTS

2016/0209025 A1 7/2016 Matthews et al.
2017/0289419 A1 10/2017 Yang
2018/0205836 A1* 7/2018 Odagaki ............ H04N 1/00127

* cited by examiner

ACCESSORY STROBE INTERFACE

PRIORITY CLAIM

This patent claims priority to U.S. Provisional Patent Application No. 62/893,356 to Baer et al., entitled "ACCESSORY STROBE INTERFACE", filed Aug. 29, 2019, which is incorporated by reference in its entirety.

BACKGROUND

1. Technical Field

Embodiments described herein relate to systems and methods associated with an accessory for a mobile device. More particularly, embodiments described herein relate to systems and methods associated a strobe accessory for a mobile device.

2. Description of Related Art

Small, mobile multipurpose devices such as smartphones and tablet or pad devices commonly have one or more cameras for taking pictures. An internal strobe or flash positioned near the camera is typically provided on such multipurpose devices as well. These devices may also include programming that determines whether the strobe is to be used in taking a picture (e.g., based on ambient light conditions) and/or the duration and intensity of strobe illumination while the picture is taken. A metering phase (or state) on the device is typically used to determine whether the strobe is to be used and, if used, the duration and intensity of the illumination. The metering phase may include, for example, exposure metering using ambient light conditions followed by metering while brief, low intensity illumination is provided by the strobe. Focusing of the camera is also typically determined during the metering phase. Metering may also include determining white balance, color temperature, and/or other image capture properties for the camera. After the metering phase, one or more images may be captured by the camera while the strobe operates in its normal or main flash phase (state). In the main flash phase, the strobe typically operates for a shorter time than the metering phase but at a higher intensity of illumination.

Internal strobes may be provided on mobile multipurpose devices to provide convenience for the user and to maintain a small form factor for the device. External strobe devices (e.g., external strobe accessories) have generally not been developed for mobile multipurpose devices as cameras on mobile multipurpose devices are most frequently used for photography where there is little need or desire for additional illumination (e.g., amateur photography purposes). As camera technology in mobile multipurpose devices advances, there is increasing potential that mobile multipurpose device cameras may be used for more professional-type photography. There are, however, challenges in providing external strobe accessories for mobile multipurpose devices that utilize existing connectors on the mobile multipurpose devices to provide low-latency timing synchronization between the internal strobe and the external strobe accessory.

SUMMARY

In certain embodiments, an accessory strobe device is capable of mirroring the output of an internal (built-in) strobe of a mobile device. The mobile device may output a strobe control signal that includes information for both a metering strobe state (e.g., metering phase) and a main strobe state (e.g., main (normal) flash phase) of the internal strobe. The strobe control signal may be provided as output from a single data pin in a data/charging port (e.g., a port that provides both data and power connections). The strobe control signal may include temporally separated pulses that differentiate the metering strobe state and the main strobe state of the internal strobe based on the time and duration of the pulses. The accessory strobe device may receive the strobe control signal and assess the pulses in the strobe control signal to determine the timing and duration of strobe illumination provided by the accessory strobe device. As the accessory strobe device determines the timing and duration of its illumination based on the time and duration of the pulses for the internal strobe, the accessory strobe may provide illumination that has a predetermined relationship (e.g., is synchronized) in both timing and relative intensity with illumination provided by the internal strobe of the mobile device.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
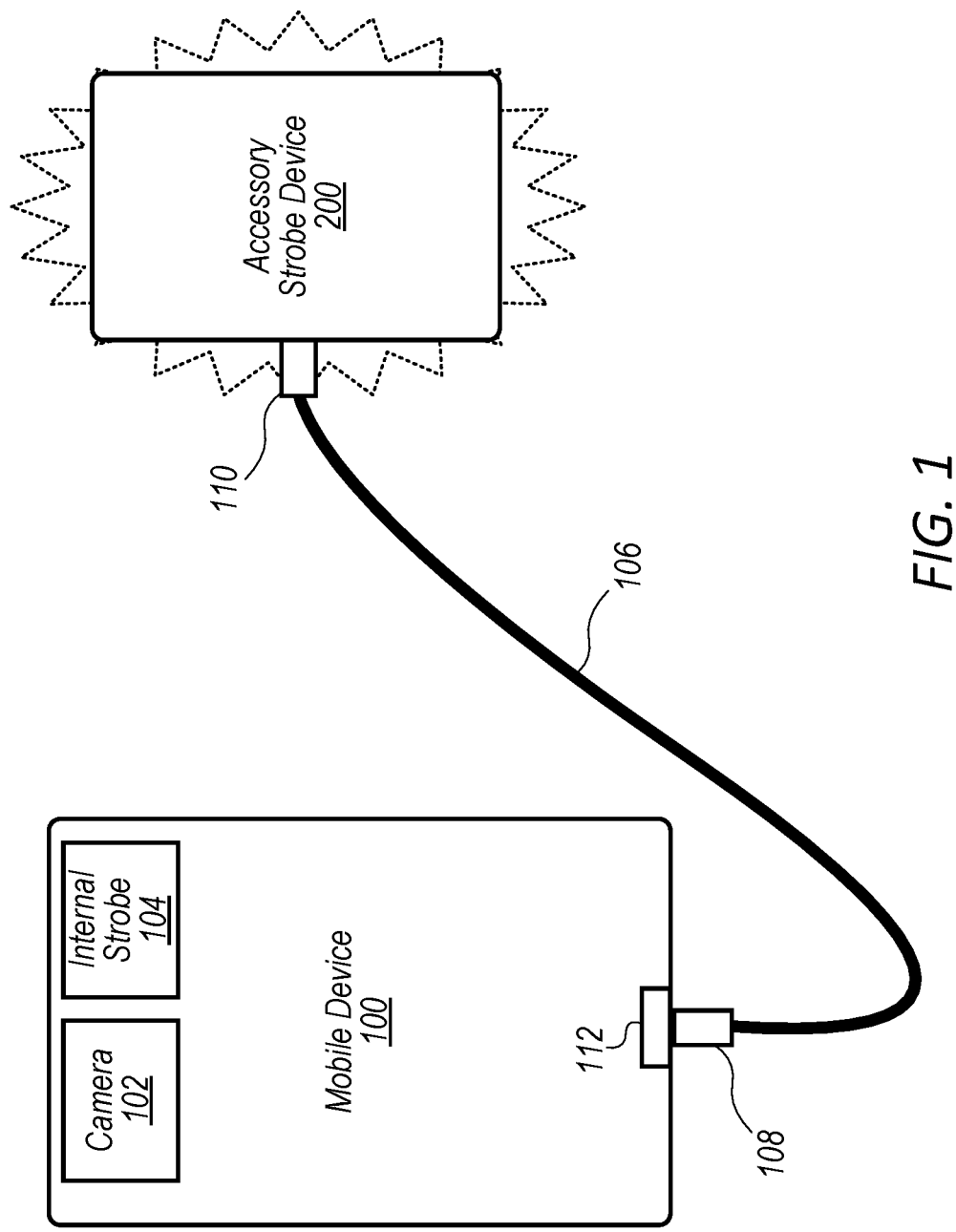
FIG. 1 depicts a representation of an embodiment of a mobile device coupled to an accessory strobe device.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

FIG. 1 depicts a representation of an embodiment of mobile device 100 coupled to accessory strobe device 200. Mobile device 100 may be a small multipurpose computing device including any of various types of a computer system device that is mobile or portable and is capable of performing wireless communication and includes camera 102. Examples of mobile devices include, but are not limited to, cell phones, smartphones, pad or tablet computing devices, laptop, netbook, notebook, subnotebook, and ultrabook computers. Various other types of devices may fall into this category if they include wireless or RF communication capabilities (e.g., Wi-Fi, cellular, and/or Bluetooth) and have a camera, such as portable gaming devices, portable Internet devices, and other handheld devices, as well as wearable devices. As described herein, the term "mobile device" may be defined to encompass any multipurpose electronic, computing, and/or telecommunications device (or combination of devices) that is easily transported by a user, is capable of wireless communication (using, for example, WLAN, Wi-Fi, cellular, and/or Bluetooth), and has a camera, where the device's primary purpose is telecommunication, computing, and/or electronic gaming. FIGS. 8-11 illustrate example mobile devices that may include one or more cameras and are capable of being coupled to embodiments of the accessory strobe device as described herein.

In certain embodiments, mobile device 100 includes one or more cameras 102 and one or more internal strobes 104 (e.g., built-in strobes). Cameras 102 and internal strobes 104 may be located either front-facing on mobile device 100 (e.g., facing on same side as a display of the mobile device) and/or back-facing on the mobile device (e.g., facing on an opposite side as the display). In some embodiments, the display of the mobile device is used as internal strobes 104 or the internal strobes may be a part of the display. In some embodiments of mobile device 100, cameras 102 and internal strobes 104 are placed in pairs on mobile device 100 (e.g., one camera is paired with one internal strobe). In other embodiments, groupings of multiple cameras 102 and/or multiple internal strobes 104 may also be contemplated (e.g., two cameras grouped with one internal strobe).

In certain embodiments, accessory strobe device 200 is an LED strobe device. Other types of strobe devices may also be contemplated including, but not limited to, a xenon strobe device or a combination LED/xenon strobe device. In certain embodiments, strobe device 200 is coupled to mobile device 100 using cable 106 and connector 108. In some embodiments, strobe device 200 is coupled to cable 106 using connector 110. Connector 110 may be, for example, a USB-type connector or another similar connector. In some embodiments, cable 106 is part of strobe device 200 (e.g., cable 106 is internally connected to the strobe device).

Figure 2:
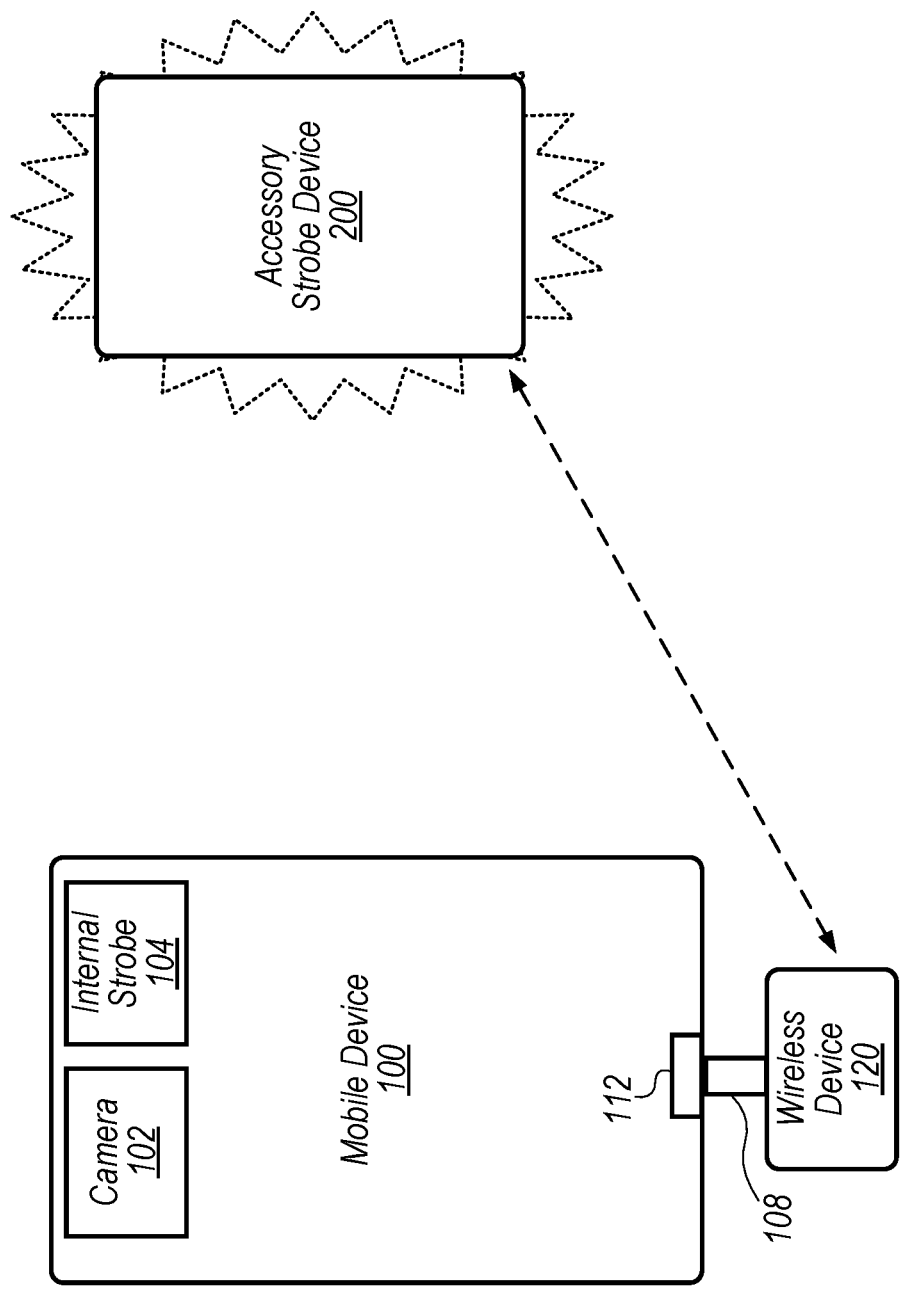
FIG. 2 depicts a representation of an embodiment of a mobile device coupled to an accessory strobe device using a wireless device.

In some embodiments, strobe device 200 is wirelessly coupled mobile device 100. FIG. 2 depicts a representation of an embodiment of mobile device 100 coupled to accessory strobe device 200 using wireless device 120. Wireless device 120 may be, for example, a wireless dongle or other wireless transmitter/receiver device coupled to port 112 using connector 108. In some embodiments, connector 108 and wireless device 120 are integrated into a single device. Wireless device 120 may be capable of transmitting and receiving signals using one or more wireless transmission protocols such as, but not limited to, IRDA, Wi-Fi, and Bluetooth. Strobe device 200 may be capable of receiving signals from (and, in some embodiments, transmitting signals to) wireless device 120. In some embodiments, the wireless connection between wireless device 120 and strobe device 200 may be security-protected (e.g., the wireless device and the strobe device may have an encrypted peer-to-peer connection).

As shown in FIGS. 1 and 2, connector 108 may be coupled to port 112 on mobile device 100. In certain embodiments, port 112 is a combined charging and data port (e.g., a port that provides both bus (data) and power connections to a single connector). Examples of port 112 include, but are not limited to, a Lightning® port (Apple, Inc.), a USB-C® port (USB Implementers Forum), a Mini-USB port, or a Micro-USB port. Connector 108 may be any type of connector suitable for use with port 112. In some embodiments, connector 108 may be coupled to another port that outputs data on mobile device 100. For example, connector 108 may be coupled to a headphone jack or another serial data port on mobile device 100. In embodiments using a port other than port 112, strobe signals (e.g., the strobe control signal) may be provided from the other port using the operations described herein with respect to port 112.

Combined charging and data ports such as port 112 may have a limited number of connector contacts (e.g., pins) that are available for outputting data signals from mobile device 100. Thus, limiting the number of pins in port 112 needed to provide data signals to a single accessory device (e.g., strobe device 200) may allow the port to provide as many different signal outputs as possible. In certain embodiments, mobile device 100 is configured to provide data signals for strobe device 200 using a single data pin in port 112 (e.g., a single pin in port 112 is available for data transmission between mobile device 100 and strobe device 200). In such embodiments, connector 108 may be designed to transmit/receive data using the single data pin in port 112. For example, connector 108 may have a single data pin that connects to the single data pin in port 112. It may be noted that while connection using a single data pin is described, an additional ground connection between connector 108 and port 112 may be provided such that strobe device 200 and mobile device 100 are grounded.

Figure 3:
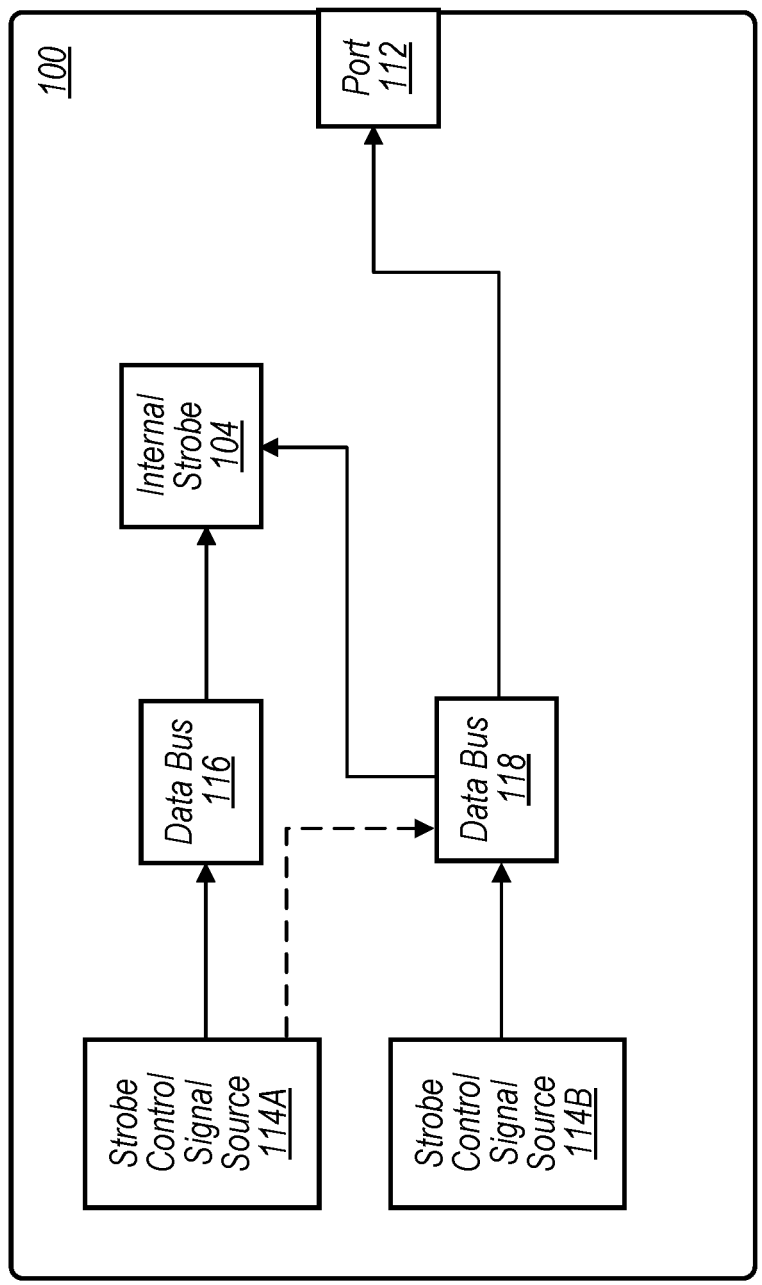
FIG. 3 depicts a block diagram representation of an embodiment of a pathway for strobe control signals in a mobile device.

In certain embodiments, mobile device 100 has substantially all strobe control signals (e.g., digital strobe control signals) for strobe device 200 placed on a single data bus in the mobile device. FIG. 3 depicts a block diagram representation of an embodiment of a pathway for strobe control signals in mobile device 100. Internal strobe control signal source(s) 114 may be connected to data bus 116 and/or data bus 118. In certain embodiments, mobile device 100 includes multiple strobe control signal sources 114 for internal strobe 104. For example, as shown in FIG. 3, strobe control signal sources may include first internal strobe control signal source 114A and second internal strobe control signal source 114B. First internal strobe control signal source 114A may be used to provide a strobe control signal for a metering state (phase) for internal strobe 104 (described herein) while second internal strobe control signal source 114B may be used to provide a strobe control signal for main (normal) state (phase) for the internal strobe (described herein). For example, first internal strobe control signal source 114A may be an in-system programming (ISP) unit while second internal strobe control signal source 114B may be an image sensor associated with camera 102.

As shown in FIG. 3, first internal strobe control signal source 114A may provide its strobe control signal to data bus 116 while second internal strobe control signal source 114B provides its strobe control signal to data bus 118. Signals from data bus 116 and data bus 118 may be provided to internal strobe 104 for control of the internal strobe. In certain embodiments, the strobe control signal from first internal strobe control signal source 114A is also provided to (e.g., routed to) data bus 118 (shown by the dashed line in FIG. 3). As such, data bus 118 becomes a single data bus having both strobe control signals placed on it (e.g., both metering state and main state strobe control signals are on the single data bus).

In certain embodiments, as shown in FIG. 3, data bus 118 (e.g., the single data bus) is coupled to port 112 (with the data bus being coupled to the single pin in port 112). Routing both the metering state and the main state strobe control signals to data bus 118 and then to port 112 provides a single data pathway to port 112 for both the strobe control signals that is substantially parallel to the signal control pathways for internal strobe 104. As such, the same strobe control signals that are being provided to internal strobe 104 may be provided to strobe device 200, when the strobe device is connected to port 112, without reconfiguring (e.g., re-interpolating) the internal probe control signals for strobe device 200 (e.g., strobe device 200 gets the same strobe control signals as internal strobe 104). Routing the strobe control signals through data bus 118 to port 112 may provide short latency between the strobe control signals arriving at internal strobe 104 and the strobe control signals arriving at strobe device 200.

It is to be understood that while the embodiments described herein contemplate routing of data signals from two different strobe control signal sources to a single data bus, other embodiments that involve single or multiple strobe control signal sources providing strobe control signals to a single data bus may also be contemplated. For example, in some embodiments, mobile device 100 may include a single strobe control signal source for internal strobe 104. In such embodiments, the single strobe control signal source may be simply routed to provide strobe control signals to data bus 118 (e.g., the single data bus), if not already routed thereto. As another example, in some embodiments, mobile device 100 may include multiple strobe control signal sources of the same type (e.g., two different image sensors may be strobe control signal sources) with the strobe control signals routed to a single data bus.

In certain embodiments, as described above, internal strobe 104 receives strobe control signals for two different states (phases) of operation on mobile device 100. The first state may be the metering state and the second state may be the main (normal) state for internal strobe 104 (e.g., the strobe state used while capturing images using camera 102 on the mobile device). In the metering state, illumination from internal strobe 104 is provided at a low intensity (e.g., a torch intensity for the internal strobe) while, in the main state, illumination from internal strobe 104 is provided at a high intensity (e.g., a maximum intensity level available for the internal strobe). Additional description for the metering state and the main state of strobe illumination are provided herein (e.g., additional description is provided for the embodiment depicted in FIG. 7).

As further described above, strobe device 200 may receive the strobe control signals for both the metering state and the main state as a single strobe control signal from data bus 118 when the strobe device is coupled to port 112 using connector 108 and either cable 106, as shown in FIG. 1, or wireless device 120, as shown in FIG. 2. In some embodiments, connector 108 is a coded connector. For example, connector 108 may be coded using an authentication chip in the connector. In some embodiments, the authentication chip may be in the body of strobe device 200 or in the body of wireless device 120. The authentication chip may authorize strobe device 200 as a device of a certain class (e.g., strobe accessory class) that is recognized and/or verified by mobile device 100 when strobe device 200 is connected to the mobile device using connector 108. Strobe device 200 may only receive the strobe control signal from mobile device 100 through connector 108 when the strobe device is authorized (e.g., authenticated) as an accessory of the certain class for the mobile device. Mobile device 100 may transmit/receive signals from port 112 after the authentication chip is recognized/verified. Without the authentication chip being recognized, no signals (e.g., the strobe control signals and/or other signals associated with port 112) may be transmitted or received through port 112. It is to be understood that while the authentication chip for strobe device 200 authorizes, when recognized/verified, mobile device 100 to output signals to connector 108 and the strobe device, the authentication chip may not necessarily provide any information on the identity of what the strobe device is to the mobile device (e.g., the authentication chip merely provides indication that it is allowed for the mobile device to transmit/receive signals from port 112 without any identification of the strobe device).

Figure 4:
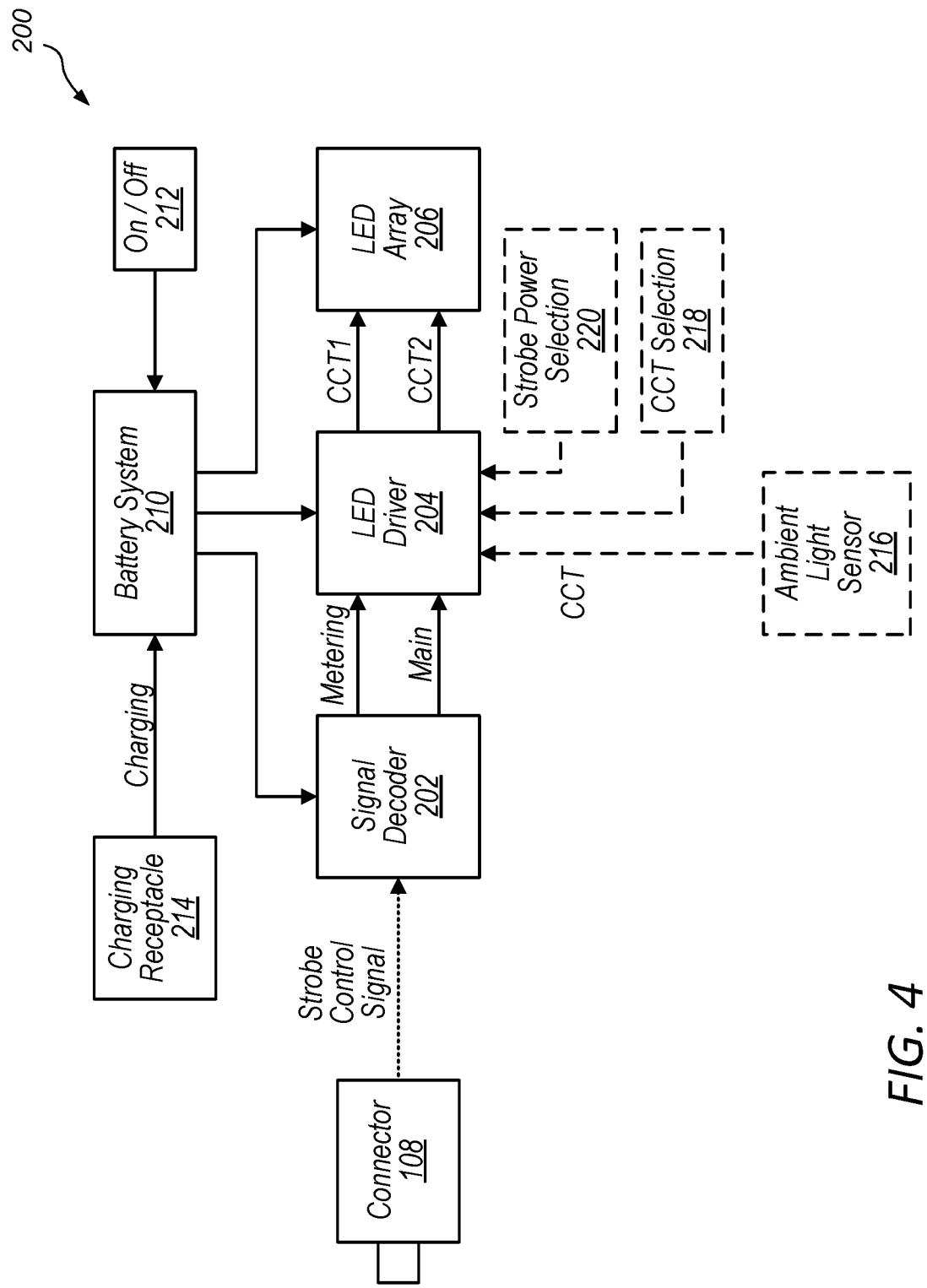
FIG. 4 depicts a block diagram of an embodiment of an accessory strobe device.

With strobe device 200 connected to mobile device 100 using connector 108 and, when necessary for certain embodiments, the strobe device is recognized/verified by mobile device 100, a strobe control signal placed on data bus 118 (shown in FIG. 3) may be provided to strobe device 200. Strobe device 200 may process the strobe control signal to provide desired illumination output from the strobe device. FIG. 4 depicts a block diagram of an embodiment of strobe device 200. In certain embodiments, the strobe control signal from connector 108 is provided to signal decoder 202. In certain embodiments, signal decoder 202 may be a signal processor such as a field programmable gate array (FPGA). Signal decoder 202 may also be, but not be limited to, a microcontroller, a custom-designed chip, a flash chip, or some type of discrete logic based controller. Signal decoder 202 may decode the strobe control signal into a metering signal and a main signal for LED driver 204. While the embodiment depicted in FIG. 4 describes signal decoder 202 as being located in strobe device 200 (e.g., coupled to battery system 210, described below), some embodiments may contemplate having the signal decoder being located in another component coupled to the strobe device 200. For example, signal decoder 202 may be located in wireless device 120, shown in FIG. 2. In such an embodiment, decoding of the strobe control signal may occur in wireless device 120 using signal decoder 202 and the wireless device may then wirelessly transmit the metering signal and the main signal for LED driver 204 to strobe device 200.

LED driver 204 may be a current driver and may include, for example, voltage dividers and/or amplifiers to provide current levels suitable to driver LED array 206 based on input signals received from signal decoder 202. LED driver 204 may provide appropriate current outputs to LED array 206 based on which input signal is received by the LED driver. For example, LED driver 204 may provide CCT1 (e.g., the metering state current output) in response to receiving the metering signal from signal decoder 202 and LED driver 204 may provide CCT2 (e.g., the main state current output) in response to receiving the main signal from signal decoder 202.

In some embodiments, LED driver 204 may be capable of selecting between different color temperatures for LED array 206, if such selection is available for the LED array. LED array 206 may be, for example, an array of LED emitters with separate sets of LED emitters having different output properties including, but not limited to, different color temperatures and different fields of view. LED driver 204 may provide CCT1 and CCT2 to drive two separate sets of emitters (LEDs) in LED array 206 that have different color temperatures. For example, CCT1 may drive a set of LEDs having a cool white (about 5500° K) color temperature while CCT2 may drive a set of LEDs having a warm white (about 2800° K) color temperature. Intermediate color temperatures between the cool white and the warm white may be obtained by balancing currents CCT1 and CCT2 to provide the desired color temperature.

In some embodiments, LED array 206 includes emitters similar to emitters in internal strobe 104. Using similar emitters in LED array 206 may allow strobe device 200 to mirror illumination from internal strobe 104 (e.g., mirror light wavelength and/or color temperature).

Signal decoder 202, LED driver 204, and LED array 206 may be powered by battery system 210. Battery system 210 may include on/off switch 212 to control power to strobe device 200. Battery system 210 may include one or more power sources capable of sustaining high peak currents (e.g., up to several A) for brief intervals of time (e.g., on the order of a few milliseconds) for strobe device 200. In some embodiments, battery system 210 includes one or more batteries coupled to circuitry with one or more voltage multipliers and one or more voltage regulators. Battery system 210 may provide power for strobe device 200 to provide brighter power outputs than internal strobe 104 in mobile device 100. In certain embodiments, battery system 210 is charged/recharged using charging receptacle 214. Charging receptacle 214 may be, for example, a USB-type receptacle (e.g., a USB-C® port) or a Lightning® port. Battery system 210 may typically be charged using an external power supply (e.g., an AC power supply or a high-capacity external DC power source such as a battery pack). In some embodiments, strobe device 200 may provide pass-through charging from charging receptacle 214. For example, when strobe device 200 is charged through charging receptacle 214, charging power may also be provided to mobile device 100 when the mobile device is also coupled to the strobe device.

Figure 5:
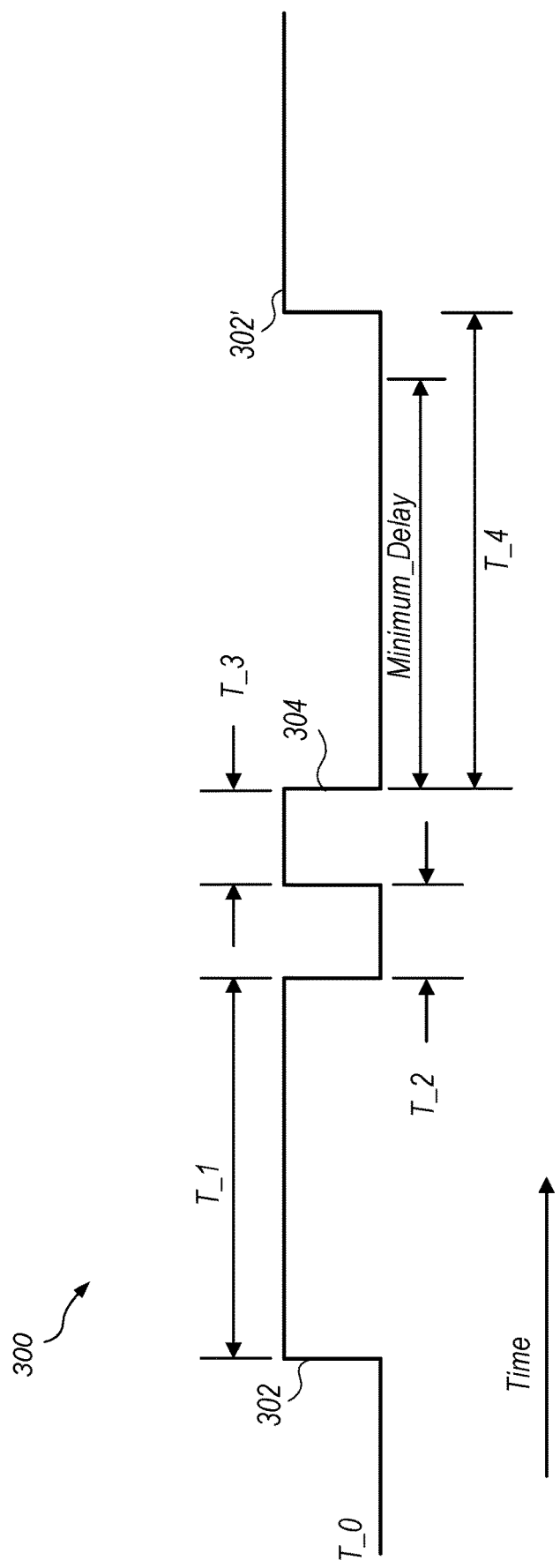
FIG. 5 depicts a representation of an embodiment of a strobe control signal as a function of time for an accessory strobe device.

As described above, the strobe control signal received in strobe device 200 is a single strobe control signal from data bus 118 (shown in FIG. 3) that includes both the strobe control signal for the metering state and the strobe control signal for the main state combined into the single strobe control signal. Signal decoder 202 may include logic to differentiate the metering state signal and the main state signal from the single strobe control signal received through connector 108. FIG. 5 depicts a representation of an embodiment of strobe control signal 300 as a function of time for strobe device 200. In certain embodiments, strobe control signal 300 is a single strobe control signal that includes two signal pulses—first pulse 302 and second pulse 304. First pulse 302 may be a pulse for the metering strobe state on mobile device 100 and second pulse 304 may be a pulse for the main strobe state on mobile device 100.

In certain embodiments, as shown in FIG. 5, first pulse 302 and second pulse 304 are similar in level (amplitude) or have the same level. Providing first pulse 302 and second pulse 304 at about the same level may provide more simple control of strobe device 200 using digital strobe control signals. In certain embodiments, first pulse 302 and second pulse 304 are temporally spaced (e.g., time separated) to allow signal decoder 202, shown in FIG. 4, to decode the pulses based on the timing of the pulses. For example, signal decoder 202 may include state machine to differentiate the signals based on timing of the pulses. The state machine may be programmed, for example, into an FPGA used as signal decoder 202.

Figure 6:
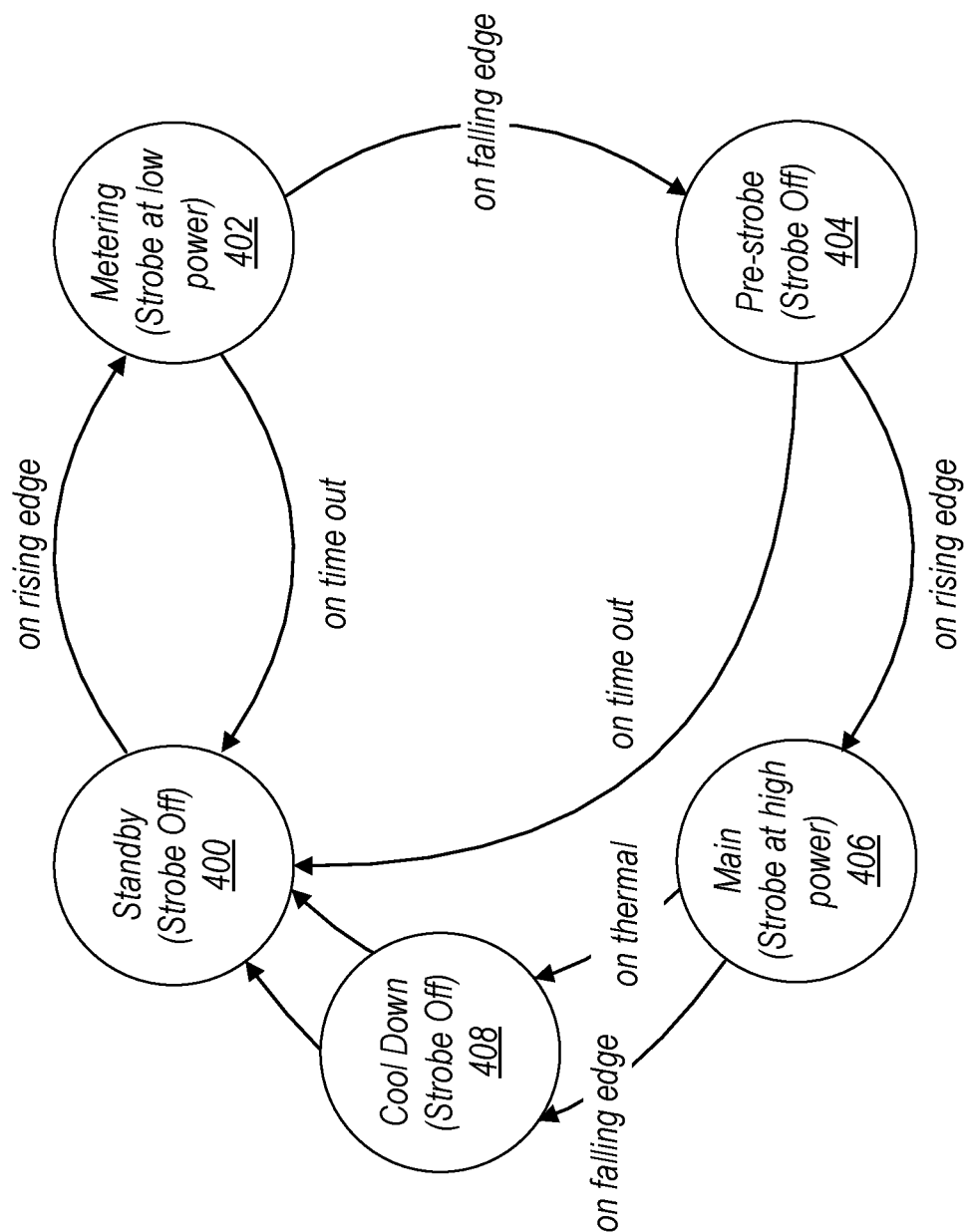
FIG. 6 depicts a flowchart of an embodiment of logic for a state machine in a signal decoder.

FIG. 6 depicts a flowchart of an embodiment of logic for a state machine in signal decoder 202. The state machine logic may be used to separate strobe control signal 300 (shown in FIG. 5) into separate metering and main output signals. The state machine logic may also include timing safety controls to prevent overheating of strobe device 200 and/or to prevent signal decoder 202 from becoming stuck in the wrong state. Some timing safety controls may cause the state machine logic to return strobe device 200 back to the standby state.

The state machine depicted in FIG. 6 is described herein in combination with the timing for strobe control signal 300 depicted in FIG. 5. For simplicity in the description, references are made to elements in both FIG. 5 and FIG. 6 without explicit reference to which figure the element is depicted in. Additionally, the time periods for states in the logic for the state machine and strobe control signal 300 described herein are merely provided as examples on the order of what may be encountered in operation of mobile device 100 and strobe device 100. It is to be understood that the actual time periods used may vary and other time periods may be contemplated depending on the characteristics of mobile device 100 and strobe device 200.

At "T_0" in strobe control signal 300, the state machine is at "Standby 400". As the rising edge of "T_1" begins (e.g., rising edge of first pulse 302), the state machine transitions to "Metering 402". In "Metering 402", the strobe is turned on at low power (e.g., torch power or metering state power) and used for the metering state (phase) of mobile device 100 (e.g., the metering signal is provided from signal decoder 202, as shown in FIG. 4). The strobe is left on at the low (metering) power for the duration of "T_1" until the falling edge of first pulse 302 (end of "T_1"), where the state is transitioned to "Pre-strobe 404" at which the strobe is turned off. In some instances, if the state is in "Metering 402" past a threshold (e.g., "T_1" is above a time threshold), then the strobe is returned to "Standby 400" to await the next strobe control signal or pulse. The strobe may be left in "Metering 402" too long if, for example, the falling edge of "T_1" is missed or does not come for any reason. The strobe may be returned to "Standby 400" to prevent the strobe device from becoming stuck in the "Metering 402" state. A typical time for the metering state ("T_1") may be between about 0.1 seconds and about 5 seconds though shorter or longer times may also be possible (e.g., the typical time may be between about 2 seconds and about 4 seconds). Thus, in some embodiments, the time threshold for returning to "Standby 400" may be set at a few seconds (e.g., about 2 seconds to 10 seconds or about 3 seconds to about 5 seconds).

The strobe may be in "Pre-strobe 404" during "T_2" in strobe control signal 300. "T_2" may be a time delay between first pulse 302 and second pulse 304. In certain embodiments, a minimum value of "T_2" is needed for the state machine to recognize a transition (e.g., for the state machine to recognize the rising edge after "Pre-strobe 404"). The minimum value of "T_2" may be, for example, between about 1 millisecond and about 10 milliseconds. A maximum allowable time for "T_2" may also be set, where if the maximum allowable time is exceeded and the state machine does not see the rising edge while at "Pre-strobe 404" (e.g., the rising edge of second pulse 304 at beginning of "T_3"), then the state machine will return the strobe to "Standby 400" and await the next strobe control signal or pulse. The maximum allowable time may be, for example, about 100 milliseconds up to about 1 second depending on the characteristics of mobile device 100.

When the rising edge of second pulse 304 at beginning of "T_3" is detected, the state machine moves the state to "Main 406". In "Main 406", the strobe is turned on to a maximum available power for the strobe (e.g., high power for the strobe indicated by the main signal being provided from signal decoder 202, as shown in FIG. 4) and for the duration of "T_3". Since the strobe is turned on to the maximum intensity level (e.g., maximum intensity level available) for the duration of "T_3", the length of "T_3" may control the overall illumination intensity provided by the strobe during "Main 406". The illumination during "Main 406" and "T_3" may be used for the main state of capturing pictures using mobile device 100. In certain embodiments, "Main 406" is a shorter period of time than "Metering 402". For example, "Main 406" may have a duration of between about 10 milliseconds and about 200 milliseconds (as compared to a few seconds for "Metering 402"). In some embodiments, "Main 406" may have a duration of between about 1 millisecond and about 250 milliseconds. The duration of "Main 406" state may be timed out at an upper threshold to prevent thermal overheating of the strobe due to the high-power operation of the strobe during this state. For example, in some embodiments, "Main 406" may be timed out and the state is moved to "Cool Down 408" if "T_3" reaches a time of about 250 milliseconds. Otherwise, the state machine may move the strobe to "Cool Down 408" when the state machine recognizes the falling edge of second pulse 304 (e.g., the end of "T_3"). In "Cool Down 408", the strobe may be turned off and a minimum delay is provided. The minimum delay may be provided to prevent overheating of the strobe by allowing the strobe to cool down before another active strobe operation begins. The time for the minimum delay may be included in "T_4" as "Minimum_Delay" on strobe control signal 300. After the minimum delay is reached, the state machine may move to "Standby 400", where the state machine waits for the next active strobe operation to begin (with any time in "Standby 400" also included in "T_4"). For example, upon returning to "Standby 400", the state machine may wait for the next control signal or pulse, as indicated by the rising edge of the next first pulse 302'. Thus, "T_4", which includes the minimum delay and the standby time, may end when the rising edge of the next first pulse 302' is encountered.

As shown in FIGS. 4-6, signal decoder 202 may decode a single strobe control signal (e.g., strobe control signal 300) into a metering signal and a main signal based on temporal separation of pulses in the single strobe control signal. Additionally, as the single strobe control signal corresponds to strobe control signals provided for internal strobe 104 (e.g., the single strobe control signal used in strobe device 200 is based off the signals used for internal strobe 104, as described herein), decoding of the single strobe control signal into separate metering and main signals may allow strobe device 200 to operate in a predetermined relationship with internal strobe 104 low latency for the operation of the strobe device. Thus, strobe device 200 may operate synchronously (e.g., a predetermined relationship that is synchronous) with internal strobe 104 (e.g., the strobe device and the internal strobe device turn on and off (the strobes start and stop) at essentially the same time). As described herein, synchronous operation of strobe device 200 with respect to operation of internal strobe 104 may include the strobe device operating (e.g., turning on/off) with a relatively insignificant delay (e.g., low latency on the order of a few milliseconds) compared to the internal strobe.

Strobe device 200 may have a power ratio between the main (normal) strobe state and the metering (torch) strobe state that has a predetermined relationship to a power ratio between the main (normal) strobe state and the metering (torch) strobe state for internal strobe 104. In certain embodiments, strobe device 200 has a power ratio between the main strobe state and the metering strobe state that is synchronous to (e.g., is on the order of, or substantially the same as) the power ratio between the main strobe state and the metering strobe state for internal strobe 104. As described herein, in the main strobe state, internal strobe 104 may have higher power (e.g., intensity) to provide brighter, more intense illumination that is useful for capturing images. In the metering strobe state, internal strobe 104 may provide lower power (intensity), longer timed illumination that brightens up the scene and allows for exposure and other metering measurements by sensors on mobile device 100 to determine the length of the main strobe state.

In certain embodiments, the main strobe state and the metering strobe state are set at fixed power (intensity) levels for internal strobe 104. For example, internal strobe 104 may have a set power ratio between the main strobe state and the metering strobe state of about 10:1 or about 20:1. In some embodiments, relative levels for the main strobe state and the metering strobe state are set based on the power ratio and a maximum intensity (power) level available for internal strobe 104. For example, the power level for the main strobe state may be set at the maximum intensity level available for internal strobe 104 and then the metering strobe state power level may be set based on the power ratio (e.g., 1/20 of the maximum intensity level available for the internal strobe for a 20:1 ratio). In certain embodiments, the maximum intensity level available for internal strobe 104 is determined based on the maximum power level that can be sustained by the internal strobe for a selected maximum main state pulse duration. For example, the main state pulse duration may correspond to "T_3", described above, which, in one embodiment, may have a maximum allowable time of about 250 milliseconds. The maximum power level that can be sustained may be based on factors such as, but not limited to, maximum LED junction temperature allowed in internal strobe 104 and battery level in mobile device 100. Setting and fixing the power levels may provide a simpler operating device and allow metering to be accomplished more quickly and more accurately.

As described above, having strobe device 200 set at substantially the same power ratio as internal strobe 104 may allow strobe device 200 to provide relative intensity levels of illumination for the main strobe state and the metering strobe state that are synchronous with (e.g., the predetermined relationship is synchronization) the relative intensity levels of illumination provided by internal strobe 104. Providing substantially the same relative intensity levels from strobe device 200 as internal strobe 104 may allow metering algorithms, described herein, that operate during the metering strobe state to more accurately determine proper exposure levels and other properties for the main strobe state. For example, when strobe device 200 provides relative intensity levels that are synchronous with relative intensity levels of illumination provided by internal strobe 104, the metering algorithms may not need any additional information about where the extra light is coming from (e.g., the metering algorithms may make accurate calculations regardless of the source of light).

In certain embodiments, LED driver 204, shown in FIG. 4, determines the power ratio for the main strobe state and the metering strobe state of strobe device 200. As described above, LED driver 204 may provide current outputs CCT1 and CCT2 where CCT1 drives a set of LEDs at a first color temperature and CCT2 drives a set of LEDs at a second color temperature and the current outputs may be balanced to provide a selected color temperature using LED array 206. The sum of current outputs CCT1 and CCT2 may determine the operating power of LED array 206 and strobe device 200. Thus, different operating powers for strobe device 200 that correspond to the desired power ratio for the main strobe state and the metering strobe state may be provided by adjusting the sum of current outputs CCT1 and CCT2 while maintaining the balance between the current outputs to provide the selected color temperature. For example, LED driver 204 may programmed to set a higher current level for the main strobe state (e.g., sum of current outputs CCT1 and CCT2 to provide main strobe power) to be 20 times a lower current level for the metering strobe state (e.g., sum of current outputs CCT1 and CCT2 to provide metering strobe power) for a set power ratio of 20:1. Thus, in response to receiving the metering signal from signal decoder 202 (the metering signal being decoded from the strobe control signal as described herein), LED driver 204 may provide the lower current level to LED array 206. In response to receiving the main signal from signal decoder 202 (the main signal being decoded from the strobe control signal as described herein), LED driver 204 may provide the higher current level to LED. In some embodiments, signal decoder 202 may determine current levels for LED driver 204 based on the decoding of the strobe control signal. In such embodiments, the current levels determined in signal decoder 202 may be provided to LED driver 204 along with either the metering signal or the main signal.

In some embodiments, the higher current level for LED array 206 may be set at a maximum current level available for strobe device 200. The maximum current level may provide the maximum intensity available for strobe device 200. The maximum current level available for strobe device 200 may be determined based on the maximum power level that can be sustained by the LED array for a selected maximum main state pulse duration. The maximum current level that can be sustained may be based on the same factors as for internal strobe 104 (e.g., factors such as, but not limited to, maximum LED junction temperature allowed in strobe device 100 and battery level in battery system 210). The lower current level may then be set based on the power ratio for strobe device 200. For example, the lower current level may be set at 1/20 of the maximum current level for a power ratio of 20:1 (main state to metering state). As one non-limiting example, the lower current level may be about 100 mA while the higher current level may be about 2 A.

As described herein, strobe device 200 may receive a single strobe control signal (e.g., strobe control signal 300) through connector 108 from mobile device 100. Strobe device 200 may utilize the single strobe control signal to determine the timing of strobe states (e.g., metering strobe state and main strobe state as determined by signal decoder 202) and the power levels of the strobe states (e.g., metering strobe state power level and main strobe state power level as determined by LED driver 204). Thus, strobe device 200 may receive the single strobe control signal from mobile device 100 and determine timing and power levels of strobe states along a serial path.

In some embodiments, strobe device 200, as shown in FIG. 4, includes one or more enhancements (shown by dashed lines). Enhancements may include, but not be limited to, ambient light sensor 216, CCT (correlated color temperature) selection 218, and strobe power selection 220. These enhancements may be, for example, controls that allow a user to manually refine or determine one or more operating characteristics of strobe device 200. Providing manual control of these operating characteristics properties may allow the user to have more fine-tuned control of illumination and create different lighting scenarios (e.g., allow a professional photographer to create different camera shot characteristics). In certain embodiments, controls provided ambient light sensor 216, CCT selection 218, and strobe power selection 220 are implemented in LED driver 204.

Ambient light sensor 216 (or camera 102) may be used to detect ambient light for strobe device 200 to help determine the color or color temperature (e.g., CCT) of LED array 206. For example, LED driver 204 may be capable of selecting between LEDs (emitters) of different colors in LED array 206 based on the color or color temperature of ambient light detected by ambient light sensor 216 (or camera 102). In some embodiments, the color of LED array 206 (e.g., color temperature selected by the balance between CCT1 and CCT2 from LED driver 204) is matched to the color measured using ambient light sensor 216. CCT selection 218 may be a control (e.g., manual control) of the CCT of LED array 206. For example, CCT selection 218 may be provided to LED driver 204 to select emitters ranging between warm white emitters and cool white emitters in LED array 206 (e.g., change balance between CCT1 and CCT2 provided by the LED driver to change color temperature). Strobe power selection 220 may be a control (e.g., manual control) to allow changes to the set power ratio of higher current level to lower current level provided by LED driver 204 (e.g., changes to the power ratio that mirrors the power ratio of internal strobe 104). Changing the power ratio using strobe power selection 220 may provide control over the relative intensity of illumination between the metering strobe state and the main strobe state of strobe device 200.

Figure 7:
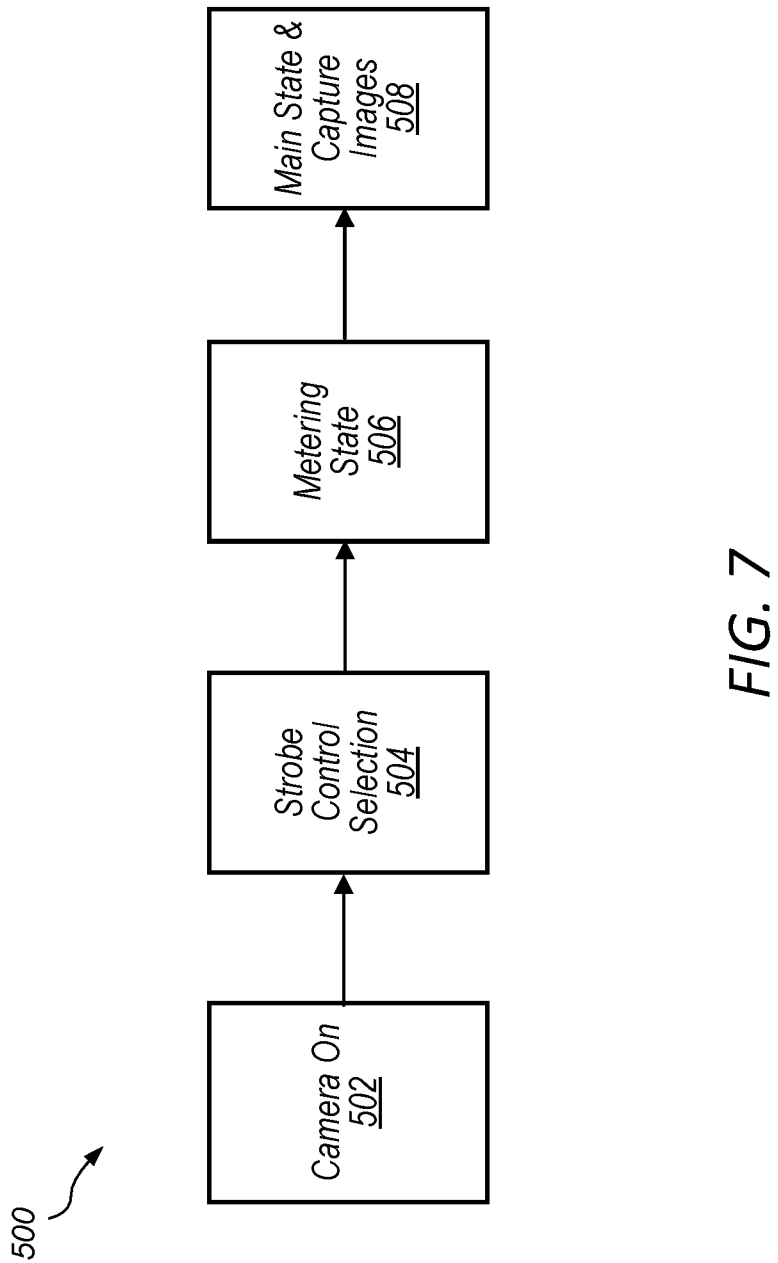
FIG. 7 depicts a flowchart of an embodiment of a camera operation process using an internal strobe and an accessory strobe device with a mobile device.

FIG. 7 depicts a flowchart of an embodiment of camera operation process 500 using internal strobe 104 and strobe device 200 with mobile device 100. Process 500 may operate with strobe device 200 coupled to mobile device 100 using connector 108 and port 112. In certain embodiments, process 500 operates when strobe device 200 mirrors operation of internal strobe 104. In some embodiments, as described herein, strobe device 200 operates synchronously with internal strobe 104 with mobile device 100 being unaware that the strobe device is coupled to the mobile device. In certain embodiments, process 500 operates when strobe device 200 receives the single strobe control signal from mobile device 100, as described above. In some embodiments, process 500 may operate when strobe device 200 receives any strobe control signal from mobile device 100 that signal decoder 202 is capable of processing to provide separate timing for the metering and main signals provided to LED driver 204 for driving LED array 206 to provide illumination from the strobe device.

Process 500 may begin with the camera (e.g., camera 102) being turned on in 502. Turning the camera on in 502 may include, but not be limited, opening a camera application on mobile device 100. The camera may begin operating when being turned on, which may include streaming images (e.g., capturing preview images) while waiting for a user to activate the camera to capture one or more images (e.g., the user presses a shutter button on the device or provides some input that begins an image capture process using the camera). It should be noted that once the camera is turned on and operating in 502, mobile device 100 may begin monitoring/assessing ambient light conditions with camera 102 and/or additional associated sensors. For example, mobile device 100 may be continuously metering and adjusting exposure settings (e.g., analog gain and integration time) and/or focus settings while camera 102 is turned on. In some embodiments, mobile device 100 may capture preview images and assess the images to meter and adjust the exposure settings for ambient light conditions and/or the focus settings.

With the camera turned on, a strobe mode may be selected in strobe control selection 504. In strobe control selection 504, a user may select a strobe mode on mobile device 100. Examples of strobe modes that may be selected include, but may not be limited to, "OFF", "ON" and "AUTO". Internal strobe 104 and strobe device 200 will not fire (illuminate) if "OFF" strobe mode is selected regardless of ambient light levels detected by sensors on mobile device 100. For "ON" strobe mode, internal strobe 104 and strobe device 200 will fire (illuminate) as long as selected conditions exist (e.g., internal strobe 104 is not overheated or other conditions that may adversely affect operation of the internal strobe). For "AUTO", internal strobe 104 and strobe device 200 are activated when selected lighting conditions are determined (e.g., ambient lighting conditions are determined to warrant additional illumination).

Process 500 may enter metering state 506 (e.g., the metering strobe state or metering phase) after a user activates the camera to capture one or more images using the camera (e.g., the user provides an input, such as pressing a shutter button on the device, to begin taking one or more pictures with the camera). In metering state 506, internal strobe 104 and strobe device 200 are turned on to provide illumination at metering state power (e.g., low power or torch power intensity) and light up the scene for the camera. Preview images may be captured by the camera during metering state 506. Metering software and/or algorithms located on mobile device 100 may assess the images captured during metering state 506 along with exposure metering during ambient light conditions (described above) to determine operating conditions for camera 102, internal strobe 104, and strobe device 200 to be used while capturing images using the camera. Determining operating conditions may include determining the duration of the illumination during main state (normal) strobe operation provided by internal strobe 104 as well as strobe device 200, which mirrors the internal strobe. The duration of the main state strobe operation may determine the intensity of illumination in the main state strobe operation due to internal strobe 104 and strobe device operating at their maximum intensity level. Other operating conditions that may be determined during metering state 506 include, but are not limited to, focus, white balance, color temperature, and/or other image capture properties associated with camera 102.

In some embodiments, determining operating conditions during metering state 506 includes determining a strobe operating mode for internal strobe 104 and strobe device 200. The strobe operating mode may be determined to be, for example, either a low-light operating mode or a rear-curtain sync operating mode. The strobe operating mode may be determined based on factors such as, but not limited to, subject distance and ambient illumination level. Low-light operating mode may be used, for instance, when there is very dim light and no subject is detected in a foreground of the image scene. In low-light operating mode, internal strobe 104 and strobe device 200 are active for an entire duration of an image frame capture. Operating internal strobe 104 and strobe device 200 in low-light operating mode may maximize the useful duration of the strobe pulse and, thus, the range of illumination provided by internal strobe 104 and strobe device 200. Rear-curtain sync operating mode may be used when other conditions besides low-light operating mode conditions are detected. Rear-curtain sync operating mode may be used to balance the brightness of foreground objects with ambient illumination in the background of the image scene (which may be out of the range of internal strobe 104 and strobe device 200). In rear-curtain sync mode, illumination from internal strobe 104 and strobe device 200 may only be active during the interval in which all pixels integrate light.

After, the operating conditions are determined during metering state 506, process 500 may enter main state 508 (e.g., the main strobe state or normal flash phase). In main state 508, internal strobe 104 and strobe device 200 are turned on and provide illumination at main state power (e.g., high power or maximum intensity level available) and light up the scene for the camera for a selected amount of time (e.g., selected duration). Internal strobe 104 and strobe device 200 may be operated in main state 508 at the conditions (e.g., duration and/or strobe operating mode) determined during metering state 506. As internal strobe 104 and strobe device 200 are typically operated at the maximum intensity level available, controlling the duration of operation in main state 508 may determine the intensity of illumination for the main state. One or more images may be captured using camera 102 during main state 508 while illumination from internal strobe 104 and strobe device 200 is turned on.

Images captured during main state 508 may be captured at a high frame rate (e.g., 60 frames per second). As described herein, the intensity of illumination during main state 508 is determined by the duration of the illumination during the main state strobe. Thus, accuracy in timing of the main strobe state using internal strobe 104 and strobe device 200 may be needed to provide optimal lighting conditions during image capture because of the high frame capture rate and thus, high quality image captures. Internal strobe 104 may be designed and programmed to provide the accuracy in timing needed for capturing high quality images with camera 102. In some instances, the addition of supplemental illumination (such as illumination from strobe device 200) may produce problems with timing of illumination and image capture. In embodiments of strobe device 200 described herein, however, the strobe device may receive strobe control signals associated with internal strobe 104 at low latency. Receiving the signals with low latency may allow strobe device 200 to maintain the timing accuracy needed for high quality image captures using mobile device 100.

In some embodiments, the connection between connector 108 and port 112, shown in FIG. 1, may allow for two-way serial communication between strobe device 200 and mobile device 100. Two-way serial communication between strobe device 200 and mobile device 100 may be provided for additional functionalities for the strobe device. With two-way communication, strobe device 200 may be capable of providing information about the capabilities/characteristics of the strobe device to mobile device 100. For example, signal decoder 202 in strobe device 200 may be programmed with the information about the capabilities/characteristics of the strobe device. Mobile device 100 may operate camera 102 and/or internal strobe 104 in combination with strobe device 200 based on the information received about the strobe device. Information about strobe device 200 may include, but not be limited to, illumination intensity, color temperature, and internal latency of strobe device.

In some embodiments, having information about strobe device 200 may allow mobile device 100 to turn off internal strobe 104 and only use strobe device 200 for illumination. For example, metering algorithms, described herein, may rely on specific information about internal strobe 104 to determine main strobe state operating conditions. With two-way communication, the metering algorithms may be able to acquire information about strobe device 200 (e.g., intensity and color temperature) to allow metering to be accomplished with only strobe device 200 or with strobe device 200 operating at power ratios other than the power ratio of internal strobe 104. In some embodiments, mobile device 100 may have a switch (such as a switch in the user interface (UI) of the device) that controls selection of using internal strobe 104, strobe device 200, or both the internal strobe and the strobe device.

In some embodiments, two-way communication between strobe device 200 and mobile device 100 may allow the strobe device to be operated to provide creative or enhanced lighting effects for the mobile device. For example, the start/stop timing and/or intensity level of strobe device 200 may be different relative to the start/stop timing and/or intensity level of internal strobe 104 to create different lighting effects. In some embodiments, the timing between strobe device 200 and internal strobe 104 may be adjusted such that the strobe device does not operate synchronously with the internal strobe (e.g., the strobe device has a shorter or longer main strobe state than the internal strobe). Adjustments to the timing may be provided, for example, by providing a strobe control signal to strobe device 200 from mobile device 100 with the adjusted timing or, for example, adjusting a manual timing control on the strobe device. Additionally, intensity of strobe device 200 during the main strobe state may be adjusted compared to internal strobe 104. As a specific example, in one embodiment, strobe device 200 may provide a brief, high-intensity flash that is shorter but brighter than the flash provided by internal strobe 104.

For contemplated embodiments of a strobe accessory device where the strobe is a xenon strobe, operation of the strobe accessory device may differ from an LED strobe accessory device (e.g., strobe device 200 with LED driver 204 and LED array 206, shown in FIG. 4). Operation may differ because xenon bulbs have very short pulse durations (e.g., a few microseconds) that are not on the order of the LED illumination of internal strobe 104 (e.g., a few milliseconds). Thus, in one-way communication embodiments (e.g., embodiments where mobile device 100 is unaware of the presence of the strobe device), illumination intensity for the main strobe state cannot be controlled by length (duration) of the strobe pulse but rather needs to be controlled by the power output provided by the xenon bulb. In such embodiments, the power level of the xenon strobe device may be manually controlled or externally controlled (e.g., controlled outside of mobile device 100) since mobile device 100 has no information on the operation of the xenon strobe.

The additional functionalities provided by two-way serial communication may be useful for embodiments of a xenon strobe device. In some embodiments, since mobile device 100 receives information on the capabilities of the xenon strobe device, the mobile device may control the power level provided to the xenon strobe device for control of the intensity during the main strobe state. For example, since the pulse needed for the xenon strobe device is short, a pulse for the xenon strobe may include a first set of pulses used to program the brightness of the xenon strobe device followed by the pulse for operation of the xenon strobe device. Metering, however, may not be possible using the xenon strobe device because the xenon strobe may only provide very short pulses on the order of a few microseconds, where such short pulses are not useful for metering. Thus, in some embodiments, metering with the xenon strobe device attached may be accomplished with internal strobe 104 providing the metering state strobe. In such embodiments, metering algorithms on mobile device 100 may use the known information received about the xenon strobe device to translate operating conditions for the xenon strobe device to be used during the main strobe state.

Figure 8:
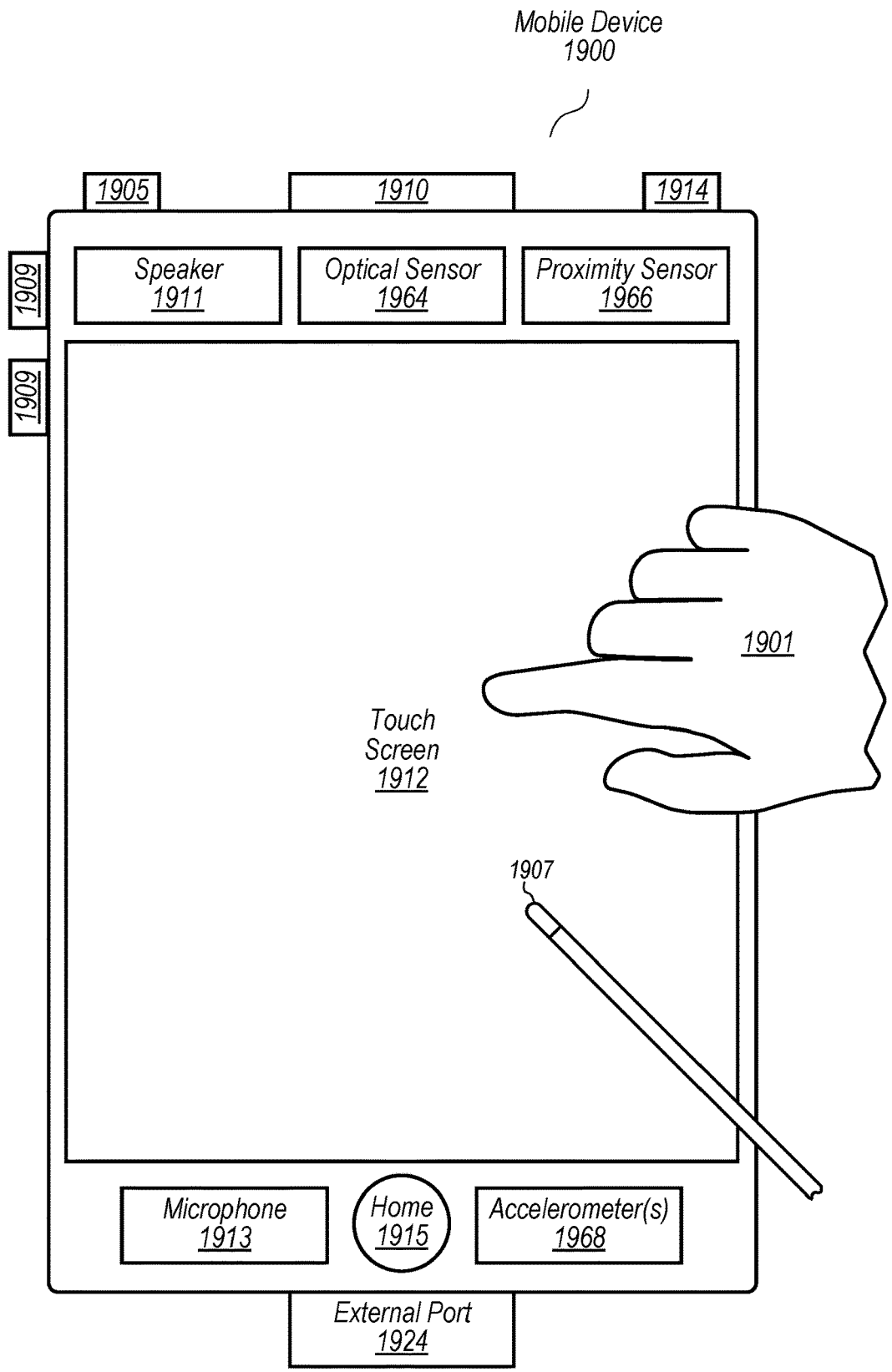
FIG. 8 illustrates a "front" side of a mobile device.
Figure 9:
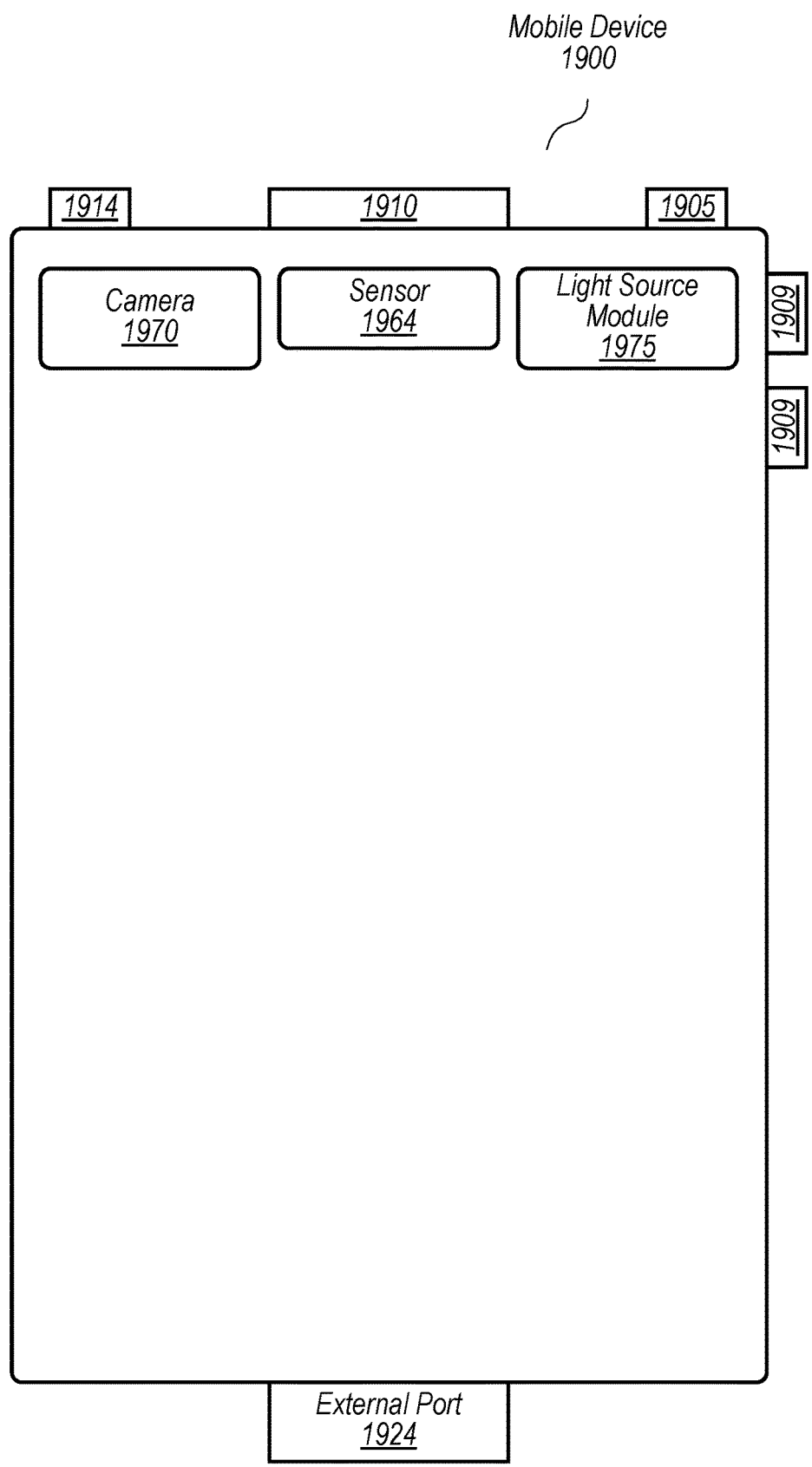
FIG. 9 illustrates a "rear" side of a mobile device.
Figure 10:
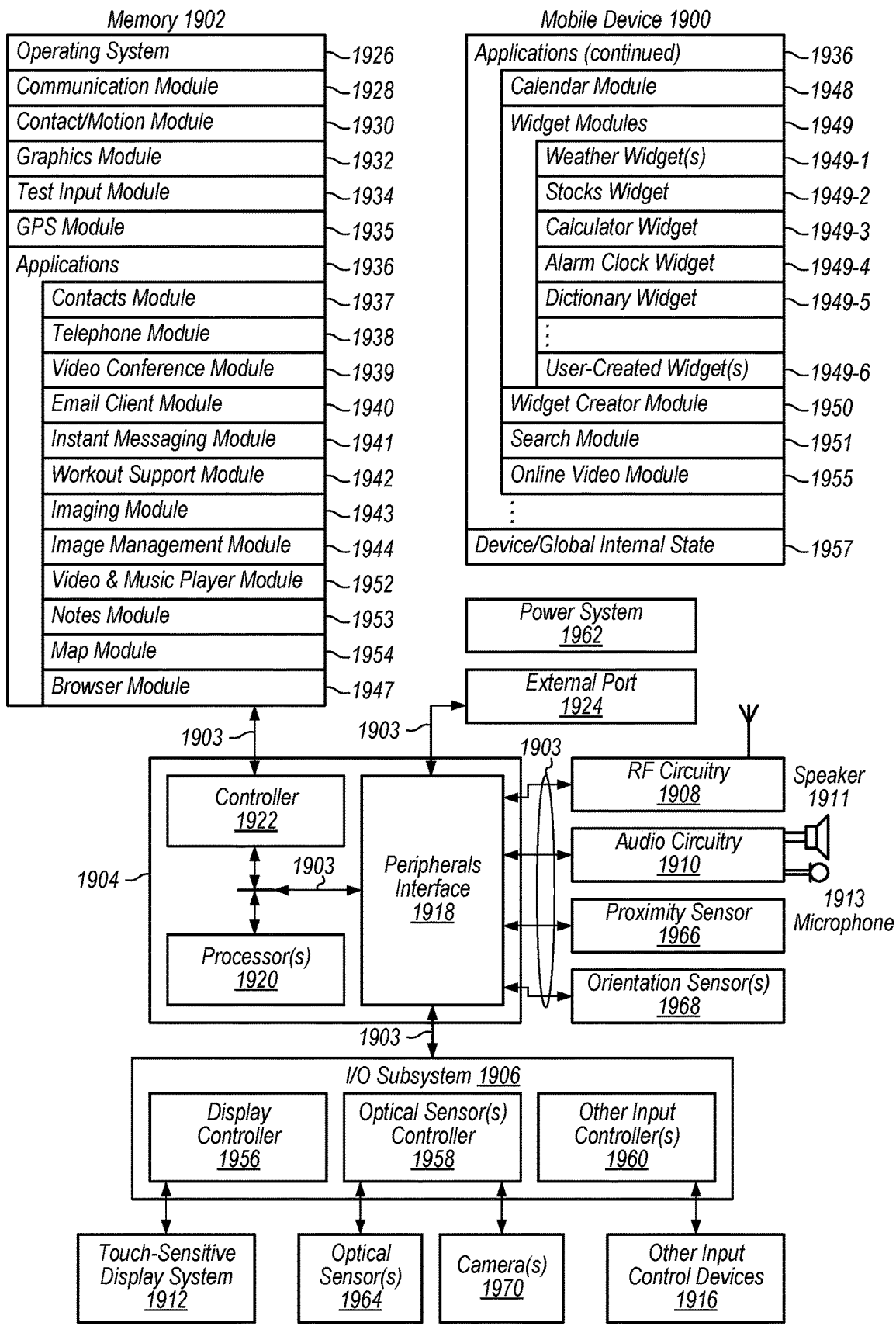
FIG. 10 illustrates a block diagram of a mobile device.

FIGS. 8-10 illustrate embodiments of mobile device 1900 that may include one or more cameras and one or more internal strobes, in accordance with embodiments as described above. In some embodiments, device 1900 may include one or multiple features, components, and/or functionality of embodiments described herein.

FIG. 8 illustrates that a "front" side of device 1900 may have touch screen 1912. Touch screen 1912 may display one or more graphics within a user interface (UI). In this embodiment, as well as others described below, a user may select one or more of the graphics by making a gesture on the graphics, for example, with one or more fingers 1901 (not drawn to scale in the figure) or one or more styluses 1907 (not drawn to scale in the figure).

Device 1900 may also include one or more physical buttons, such as "home" or menu button 1915, which may be used to navigate to any application 1936 (see FIG. 10) in a set of applications that may be executed on device 1900. Alternatively, in some embodiments, the menu button is implemented as a soft key in a graphics user interface (GUI) displayed on touch screen 1912.

In one embodiment, device 1900 includes touch screen 1912, menu button 1915, push button 1905 for powering the device on/off and locking the device, volume adjustment button(s) 1909, Subscriber Identity Module (SIM) card slot 1910, head set jack 1914, and docking/charging external port 1924, in accordance with some embodiments. Push button 1905 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1900 also may accept verbal input for activation or deactivation of some functions through microphone 1913.

FIG. 9 illustrates that a "rear" side of device 1900 may include camera 1970, in accordance with some embodiments. Camera 1970, which may be referred to as an "optical sensor" for convenience, may also be known as or called an optical sensor system. Camera 1970 may include one or more camera modules. FIG. 9 further illustrates sensor 1964 and light source module 1975. Light source module 1975 may include one or more internal strobes, in accordance with some embodiments.

Referring to FIG. 10, a block diagram illustrates that device 1900 may include memory 1902 (which may include one or more computer readable storage mediums), memory controller 1922, one or more processing units (CPU's) 1920, peripherals interface 1918, RF circuitry 1908, audio circuitry 1910, speaker 1911, touch-sensitive display system 1912, microphone 1913, input/output (I/O) subsystem 1906, other input control devices 1916, and external port 1924. Device 1900 may include one or more optical sensors 1964. These components may communicate over one or more communication buses or signal lines 1903.

It should be appreciated that device 1900 is only one example of a portable multifunction device, and that device 1900 may have more or fewer components than shown, may combine two or more components, or may have a different configuration or arrangement of the components. The various components shown in FIG. 10 may be implemented in hardware, software, or a combination of hardware and software, including one or more signal processing and/or application specific integrated circuits.

Memory 1902 may include high-speed random access memory and may also include non-volatile memory, such as one or more magnetic disk storage devices, flash memory devices, or other non-volatile solid-state memory devices. Access to memory 1902 by other components of device 1900, such as CPU 1920 and the peripherals interface 1918, may be controlled by memory controller 1922.

Peripherals interface 1918 can be used to couple input and output peripherals of the device to CPU 1920 and memory 1902. The one or more processors 1920 run or execute various software programs and/or sets of instructions stored in memory 1902 to perform various functions for device 1900 and to process data.

In some embodiments, peripherals interface 1918, CPU 1920, and memory controller 1922 may be implemented on a single chip, such as chip 1904. In some other embodiments, they may be implemented on separate chips.

RF (radio frequency) circuitry 1908 receives and sends RF signals, also called electromagnetic signals. RF circuitry 1908 converts electrical signals to/from electromagnetic signals and communicates with communications networks and other communications devices via the electromagnetic signals. RF circuitry 1908 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1908 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1910, speaker 1911, and microphone 1913 provide an audio interface between a user and device 1900. Audio circuitry 1910 receives audio data from peripherals interface 1918, converts the audio data to an electrical signal, and transmits the electrical signal to speaker 1911. Speaker 1911 converts the electrical signal to human-audible sound waves. Audio circuitry 1910 also receives electrical signals converted by microphone 1913 from sound waves. Audio circuitry 1910 converts the electrical signal to audio data and transmits the audio data to peripherals interface 1918 for processing. Audio data may be retrieved from and/or transmitted to memory 1902 and/or RF circuitry 1908 by peripherals interface 1918. In some embodiments, audio circuitry 1910 also includes a headset jack (e.g., 1914, FIGS.

8-9). The headset jack provides an interface between audio circuitry 1910 and removable audio input/output peripherals, such as output-only headphones or a headset with both output (e.g., a headphone for one or both ears) and input (e.g., a microphone).

I/O subsystem 1906 couples input/output peripherals on device 1900, such as touch screen 1912 and other input control devices 1916, to peripherals interface 1918. I/O subsystem 1906 may include display controller 1956 and one or more input controllers 1960 for other input or control devices. The one or more input controllers 1916 receive/send electrical signals from/to other input or control devices 1916. The other input control devices 1916 may include physical buttons (e.g., push buttons, rocker buttons, etc.), dials, slider switches, joysticks, click wheels, and so forth. In some alternative embodiments, input controller(s) 1960 may be coupled to any (or none) of the following: a keyboard, infrared port, USB port, and a pointer device such as a mouse. The one or more buttons (e.g., 1909, FIGS. 8-9) may include an up/down button for volume control of speaker 1911 and/or microphone 1913. The one or more buttons may include a push button (e.g., 1906, FIGS. 8-9).

Touch-sensitive display 1912 provides an input interface and an output interface between the device and a user. Display controller 1956 receives and/or sends electrical signals from/to touch screen 1912. Touch screen 1912 displays visual output to the user. The visual output may include graphics, text, icons, video, and any combination thereof (collectively termed "graphics"). In some embodiments, some or all of the visual output may correspond to user-interface objects.

Touch screen 1912 has a touch-sensitive surface, sensor or set of sensors that accepts input from the user based on haptic and/or tactile contact. Touch screen 1912 and display controller 1956 (along with any associated modules and/or sets of instructions in memory 1902) detect contact (and any movement or breaking of the contact) on touch screen 1912 and converts the detected contact into interaction with user-interface objects (e.g., one or more soft keys, icons, web pages or images) that are displayed on touch screen 1912. In an example embodiment, a point of contact between touch screen 1912 and the user corresponds to a finger of the user.

Touch screen 1912 may use LCD (liquid crystal display) technology, LPD (light emitting polymer display) technology, or LED (light emitting diode) technology, although other display technologies may be used in other embodiments. Touch screen 1912 and display controller 1956 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1912. In an example embodiment, projected mutual capacitance sensing technology may be used.

Touch screen 1912 may have a video resolution in excess of 100 dots per inch (dpi). In some embodiments, the touch screen has a video resolution of approximately 160 dpi. The user may make contact with touch screen 1912 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1900 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1912 or an extension of the touch-sensitive surface formed by the touch screen.

Device 1900 also includes power system 1962 for powering the various components. Power system 1962 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1900 may also include one or more optical sensors 1964 and one or more cameras 1970. FIG. 10 shows an optical sensor coupled to optical sensor controller 1958 in I/O subsystem 1906. Optical sensor 1964 may include charge-coupled device (CCD) or complementary metal-oxide semiconductor (CMOS) phototransistors. Optical sensor 1964 receives light from the environment, projected through one or more lens, and converts the light to data representing an image. In conjunction with camera(s) 1970 (such as an embodiment of a camera described herein), optical sensor 1964 may capture still images or video. In some embodiments, an optical sensor is located on the back of device 1900, opposite touch screen display 1912 on the front of the device, so that the touch screen display may be used as a viewfinder for still and/or video image acquisition. In some embodiments, another optical sensor is located on the front of the device so that the user's image may be obtained for videoconferencing while the user views the other videoconference participants on the touch screen display.

Device 1900 may also include one or more proximity sensors 1966. FIG. 10 shows proximity sensor 1966 coupled to peripherals interface 1918. Alternatively, proximity sensor 1966 may be coupled to input controller 1960 in I/O subsystem 1906. In some embodiments, the proximity sensor turns off and disables touch screen 1912 when the multifunction device is placed near the user's ear (e.g., when the user is making a phone call).

Device 1900 includes one or more orientation sensors 1968. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1900. In some embodiments, the one or more orientation sensors include any combination of orientation/rotation sensors. FIG. 10 shows the one or more orientation sensors 1968 coupled to peripherals interface 1918. Alternatively, the one or more orientation sensors

1968 may be coupled to an input controller 1960 in I/O subsystem 1906. In some embodiments, information is displayed on the touch screen display in a portrait view or a landscape view based on an analysis of data received from the one or more orientation sensors.

In some embodiments, the software components stored in memory 1902 include operating system 1926, communication module (or set of instructions) 1928, instructions). Furthermore, in some embodiments, memory 1902 stores device/global internal state, including information obtained from the device's various sensors and input control devices 1916; and location information concerning the device's location and/or attitude.

Operating system 1926 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1928 facilitates communication with other devices over one or more external ports 1924 and also includes various software components for handling data received by RF circuitry 1908 and/or external port 1924. External port 1924 (e.g., Universal Serial Bus (USB), FIRE-WIRE, etc.) is adapted for coupling directly to other devices, in accordance with some embodiments, or indirectly over a network (e.g., the Internet, wireless LAN, etc.).

Contact/motion module 1930 may detect contact with touch screen 1912 (in conjunction with display controller 1956) and other touch sensitive devices (e.g., a touchpad or physical click wheel). Contact/motion module 1930 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1930 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1930 and display controller 1956 detect contact on a touchpad.

Contact/motion module 1930 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1932 includes various known software components for rendering and displaying graphics on touch screen 1912 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1932 stores data representing graphics to be used. Each graphic may be assigned a corresponding code. Graphics module 1932 receives, from applications etc., one or more codes specifying graphics to be displayed along with, if necessary, coordinate data and other graphic property data, and then generates screen image data to output to display controller 1956.

Text input module 1934, which may be a component of graphics module 1932, provides soft keyboards for entering text in various applications (e.g., contacts 1937, e-mail 1940, IM 1941, browser 1947, and any other application that needs text input).

GPS module 1935 determines the location of the device and provides this information for use in various applications (e.g., to telephone 1938 for use in location-based dialing, to imaging module 1943 as picture/video metadata, and to applications that provide location-based services such as weather widgets, local yellow page widgets, and map/navigation widgets).

Applications 1936 may include the following modules (or sets of instructions), or a subset or superset thereof:
- contacts module 1937 (sometimes called an address book or contact list);
- telephone module 1938;
- video conferencing module 1939;
- e-mail client module 1940;
- instant messaging (IM) module 1941;
- workout support module 1942;
- camera module 1943 for still and/or video images;
- image management module 1944;
- browser module 1947;
- calendar module 1948;
- widget modules 1949, which may include one or more of: weather widget 1949-1, stocks widget 1949-2, calculator widget 1949-3, alarm clock widget 1949-4, dictionary widget 1949-5, and other widgets obtained by the user, as well as user-created widgets 1949-6;
- widget creator module 1950 for making user-created widgets 1949-6;
- search module 1951;
- video and music player module 1952, which may be made up of a video player module and a music player module;
- notes module 1953;
- map module 1954; and/or
- online video module 1955.

Examples of other applications 1936 that may be stored in memory 1902 include other word processing applications, other image editing applications, drawing applications, presentation applications, JAVA-enabled applications, encryption, digital rights management, voice recognition, and voice replication.

In conjunction with touch screen 1912, display controller 1956, contact module 1930, graphics module 1932, and text input module 1934, contacts module 1937 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1938, video conference 1939, e-mail 1940, or IM 1941; and so forth.

In conjunction with RF circuitry 1908, audio circuitry 1910, speaker 1911, microphone 1913, touch screen 1912, display controller 1956, contact module 1930, graphics module 1932, and text input module 1934, telephone module 1938 may be used to enter a sequence of characters corresponding to a telephone number, access one or more telephone numbers in address book 1937, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1908, audio circuitry 1910, speaker 1911, microphone 1913, touch screen 1912, display controller 1956, optical sensor 1964, optical sensor controller 1958, contact module 1930, graphics module 1932, text input module 1934, contact list 1937, and telephone module 1938, videoconferencing module 1939 includes executable instructions to initiate, conduct, and terminate a video conference between a user and one or more other participants in accordance with user instructions.

In conjunction with RF circuitry 1908, touch screen 1912, display controller 1956, contact module 1930, graphics module 1932, and text input module 1934, e-mail client module 1940 includes executable instructions to create, send, receive, and manage e-mail in response to user instructions. In conjunction with image management module 1944, e-mail client module 1940 makes it very easy to create and send e-mails with still or video images taken by imaging module 1943.

In conjunction with RF circuitry 1908, touch screen 1912, display controller 1956, contact module 1930, graphics module 1932, and text input module 1934, the instant messaging module 1941 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1908, touch screen 1912, display controller 1956, contact module 1930, graphics module 1932, text input module 1934, GPS module 1935, map module 1954, and music player module 1946, workout support module 1942 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1912, display controller 1956, optical sensor(s) 1964, camera(s) 1970, optical sensor controller 1958, light source module 1975 (see FIG. 9), contact module 1930, graphics module 1932, and image management module 1944, imaging module 1943 includes executable instructions to capture still images or video (including a video stream) and store them into memory 1902, modify characteristics of a still image or video, or delete a still image or video from memory 1902.

In conjunction with touch screen 1912, display controller 1956, optical sensor(s) 1964, camera(s) 1970, contact module 1930, graphics module 1932, text input module 1934, light source module 1975 (see FIG. 9), and imaging module 1943, image management module 1944 includes executable instructions to arrange, modify (e.g., edit), or otherwise manipulate, label, delete, present (e.g., in a digital slide show or album), and store still and/or video images.

In conjunction with RF circuitry 1908, touch screen 1912, display system controller 1956, contact module 1930, graphics module 1932, and text input module 1934, browser module 1947 includes executable instructions to browse the Internet in accordance with user instructions, including searching, linking to, receiving, and displaying web pages or portions thereof, as well as attachments and other files linked to web pages.

In conjunction with RF circuitry 1908, touch screen 1912, display system controller 1956, contact module 1930, graphics module 1932, text input module 1934, e-mail client module 1940, and browser module 1947, calendar module 1948 includes executable instructions to create, display, modify, and store calendars and data associated with calendars (e.g., calendar entries, to do lists, etc.) in accordance with user instructions.

In conjunction with RF circuitry 1908, touch screen 1912, display system controller 1956, contact module 1930, graphics module 1932, text input module 1934, and browser module 1947, widget modules 1949 are mini-applications that may be downloaded and used by a user (e.g., weather widget 1949-1, stocks widget 1949-2, calculator widget 1949-3, alarm clock widget 1949-4, and dictionary widget 1949-5) or created by the user (e.g., user-created widget 1949-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1908, touch screen 1912, display system controller 1956, contact module 1930, graphics module 1932, text input module 1934, and browser module 1947, the widget creator module 1950 may be used by a user to create widgets (e.g., turning a user-specified portion of a web page into a widget).

In conjunction with touch screen 1912, display system controller 1956, contact module 1930, graphics module 1932, and text input module 1934, search module 1951 includes executable instructions to search for text, music, sound, image, video, and/or other files in memory 1902 that match one or more search criteria (e.g., one or more user-specified search terms) in accordance with user instructions.

In conjunction with touch screen 1912, display system controller 1956, contact module 1930, graphics module 1932, audio circuitry 1910, speaker 1911, RF circuitry 1908, and browser module 1947, video and music player module 1952 includes executable instructions that allow the user to download and play back recorded music and other sound files stored in one or more file formats, such as MP3 or AAC files, and executable instructions to display, present or otherwise play back videos (e.g., on touch screen 1912 or on an external, connected display via external port 1924). In some embodiments, device 1900 may include the functionality of an MP3 player.

In conjunction with touch screen 1912, display controller 1956, contact module 1930, graphics module 1932, and text input module 1934, notes module 1953 includes executable instructions to create and manage notes, to do lists, and the like in accordance with user instructions.

In conjunction with RF circuitry 1908, touch screen 1912, display system controller 1956, contact module 1930, graphics module 1932, text input module 1934, GPS module 1935, and browser module 1947, map module 1954 may be used to receive, display, modify, and store maps and data associated with maps (e.g., driving directions; data on stores and other points of interest at or near a particular location; and other location-based data) in accordance with user instructions.

In conjunction with touch screen 1912, display system controller 1956, contact module 1930, graphics module 1932, audio circuitry 1910, speaker 1911, RF circuitry 1908, text input module 1934, e-mail client module 1940, and browser module 1947, online video module 1955 includes instructions that allow the user to access, browse, receive (e.g., by streaming and/or download), play back (e.g., on the touch screen or on an external, connected display via external port 1924), send an e-mail with a link to a particular online video, and otherwise manage online videos in one or more file formats, such as H.264. In some embodiments, instant messaging module 1941, rather than e-mail client module 1940, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 1902 may store a subset of the modules and data structures identified above. Furthermore, memory 1902 may store additional modules and data structures not described above.

In some embodiments, device 1900 is a device where operation of a predefined set of functions on the device is performed exclusively through a touch screen and/or a touchpad. By using a touch screen and/or a touchpad as the primary input control device for operation of device 1900, the number of physical input control devices (such as push buttons, dials, and the like) on device 1900 may be reduced.

The predefined set of functions that may be performed exclusively through a touch screen and/or a touchpad include navigation between user interfaces. In some embodiments, the touchpad, when touched by the user, navigates device 1900 to a main, home, or root menu from any user interface that may be displayed on device 1900. In such embodiments, the touchpad may be referred to as a "menu button." In some other embodiments, the menu button may be a physical push button or other physical input control device instead of a touchpad.

Example Computing Device

Figure 11:
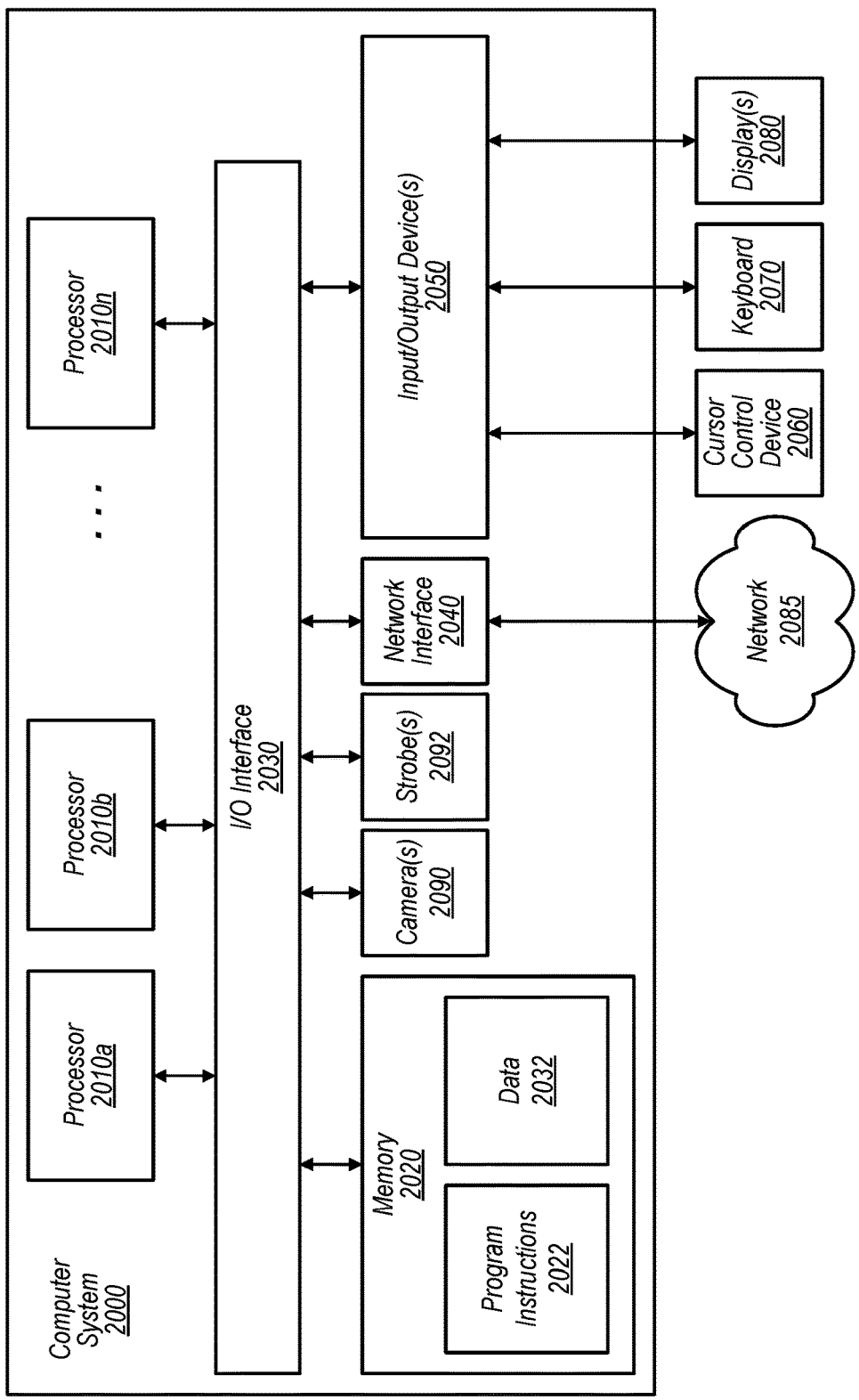
FIG. 11 illustrates an example computing device.

FIG. 11 illustrates an example computing device, referred to as computer system 2000, that may include or host embodiments of a camera, an internal strobe, and/or a strobe device as illustrated in FIGS. 1 through 7. In addition, computer system 2000 may implement methods for controlling operations of the camera, the internal strobe, the strobe device, and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090 and/or strobes 2092, for example one or more cameras or strobes as described above with respect to FIGS. 1 through 7, which may also be coupled to I/O interface 2030, or one or more cameras or strobes as described above with respect to FIGS. 1 through 7 along with one or more other cameras or strobes.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090, strobes 2092, and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 11, memory 2020 may include program instructions 2022, which may be processor-executable to implement any element or action to support integrated camera 2090 and/or strobes 2092, including but not limited to image processing software and interface software for controlling camera 2090 and/or metering algorithms and software for controlling strobes 2092. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. An accessory strobe device for a mobile device, comprising:
   a plurality of emitters; and
   at least one connector configured to receive data from the mobile device through a port on the mobile device that provides both data and power connections;
   wherein the accessory strobe device is configured to receive a single strobe control signal from the mobile device, the single strobe control signal comprising temporally separated data for both a metering strobe state and a main strobe state of an internal strobe on the mobile device, and wherein the accessory strobe device is configured to process the single strobe control signal and provide illumination from the emitters that is in a predetermined relationship with illumination provided by the internal strobe during both the metering strobe state and the main strobe state of the internal strobe.

2. The accessory strobe device of claim 1, wherein the accessory strobe device is configured to provide illumination from the emitters that is synchronous with illumination provided by the internal strobe during both the metering strobe state and the main strobe state of the internal strobe.

3. The accessory strobe device of claim 1, wherein the accessory strobe device is configured to provide illumination at a first level during the metering strobe state and at a second level during the main strobe state, the second level being higher than the first level.

4. The accessory strobe device of claim 3, wherein a ratio of the second level to the first level is substantially equal to a ratio between illumination power in the main strobe state and illumination power in the metering strobe state of the internal strobe.

5. The accessory strobe device of claim 1, wherein the emitters are LED emitters.

6. The accessory strobe device of claim 1, wherein the single strobe control signal comprises temporally separated pulses for the metering strobe state and the main strobe state of the internal strobe.

7. The accessory strobe device of claim 1, wherein the single strobe control signal is generated by routing two or more control signals for the internal strobe through a single data bus coupled to the port on the mobile device.

8. The accessory strobe device of claim 1, wherein the accessory strobe device is configured to process the single strobe control signal by decoding signals for the metering strobe state and the main strobe state of the internal strobe from the single strobe control signal.

9. An accessory strobe device for a mobile device, comprising:
   an input connector, wherein the input connector is configured to be coupled to a port on the mobile device that provides both data and power connections, wherein the input connector is configured to receive a strobe control signal through a single data pin in the port on the mobile device, the strobe control signal comprising data for both a metering strobe state and a main strobe state of an internal strobe on the mobile device;
   a signal processor coupled to the input connector, wherein the signal processor is configured to receive the strobe control signal and generate a metering strobe state signal and a main strobe state signal from the received strobe control signal;
   a current driver coupled to the signal processor, wherein the current driver is configured to output a first current level in response to receiving the metering strobe state signal from the signal processor, and wherein the current driver is configured to output a second current level in response to receiving the main strobe state signal from the signal processor; and
   an illumination array coupled to the current driver, the illumination array comprising one or more emitters, wherein the illumination array is configured to provide illumination from the emitters in response to receiving the first current level or the second current level from the current driver.

10. The accessory strobe device of claim 9, wherein the data for the metering strobe state and the main strobe state of the internal strobe are temporally separated on the strobe control signal.

11. The accessory strobe device of claim 9, wherein the metering strobe state signal and the main strobe state signal are temporally separated.

12. The accessory strobe device of claim 9, wherein the data for the metering strobe state and the main strobe state of the internal strobe comprise data of a duration of the metering strobe state and a duration of the main strobe state, and wherein the signal processor is configured to generate the metering strobe state signal for the duration of the metering strobe state and the main strobe state signal for the duration of the main strobe state.

13. The accessory strobe device of claim 9, wherein the strobe control signal comprises a single strobe control signal generated from two or more control signals for the internal strobe on the mobile device.

14. The accessory strobe device of claim 9, wherein the second current level is higher than the first current level.

15. The accessory strobe device of claim 9, wherein the illumination array comprises a first set of emitters with a first color temperature and a second set of emitters with a second color temperature, and wherein the current driver is configured to balance a current provided to the first set of emitters with a current provided to the second set of emitters to provide illumination with a selected color temperature using the illumination array.

16. A method of controlling an accessory strobe device coupled to a mobile device, comprising:
   generating, in the mobile device, a strobe control signal comprising data for both a metering strobe state and a main strobe state of an internal strobe on the mobile device;
   providing the strobe control signal as an output through a port on the mobile device that provides both data and power connections;
   receiving the strobe control signal in a connector coupled to the port on the mobile device;
   providing the strobe control signal from the connector to the accessory strobe device;
   processing the strobe control signal, in the accessory strobe device, to generate a metering strobe state signal and a main strobe state signal from the received strobe control signal;
   outputting illumination from the accessory strobe device at a first illumination power in response to the metering strobe state signal; and
   outputting illumination from the accessory strobe device at a second illumination power in response to the main strobe state signal.

17. The method of claim 16, wherein the strobe control signal is provided as output on a single data pin in the port on the mobile device.

18. The method of claim 16, wherein processing the strobe control signal to generate the metering strobe state signal and the main strobe state signal from the received strobe control signal comprises applying state machine logic to the received strobe control signal.

19. The method of claim 16, wherein the strobe control signal comprises temporally separated pulses for the metering strobe state and the main strobe state of the internal strobe, and wherein accessory strobe device determines a timing of outputting illumination at the first illumination power and a timing of outputting illumination at the second illumination power based on temporal separation and durations of the pulses.

20. The method of claim 16, wherein the accessory strobe device outputs illumination at the first illumination power during the metering strobe state of the internal strobe, and wherein the accessory strobe device outputs illumination at the second illumination power during the main strobe state of the internal strobe.

\* \* \* \* \*